(12) United States Patent
MacLachlan et al.

(10) Patent No.: US 9,296,618 B2
(45) Date of Patent: Mar. 29, 2016

(54) PROCESS FOR PREPARATION OF MESOPOROUS SILICA AND ORGANOSILICA MATERIALS

(75) Inventors: Mark John MacLachlan, Vancouver (CA); Kevin Eric Shopsowitz, Boston, MA (US); Wadood Yasser Hamad, Vancouver (CA)

(73) Assignee: FPINNOVATIONS, Pointe-Claire, QC (CA)

( * ) Notice: Subject to any disclaimer, the term of this patent is extended or adjusted under 35 U.S.C. 154(b) by 156 days.

(21) Appl. No.: 14/115,663

(22) PCT Filed: May 11, 2012

(86) PCT No.: PCT/CA2012/000457
§ 371 (c)(1),
(2), (4) Date: Feb. 4, 2014

(87) PCT Pub. No.: WO2012/151688
PCT Pub. Date: Nov. 15, 2012

(65) Prior Publication Data
US 2015/0064093 A1    Mar. 5, 2015

Related U.S. Application Data

(60) Provisional application No. 61/485,207, filed on May 12, 2011.

(51) Int. Cl.
| | | |
|---|---|---|
| *B01D 53/56* | (2006.01) | |
| *C01B 33/12* | (2006.01) | |
| *B01J 20/10* | (2006.01) | |
| *B01J 20/28* | (2006.01) | |
| *B01J 20/283* | (2006.01) | |
| *C09K 19/02* | (2006.01) | |
| *C09K 19/38* | (2006.01) | |
| *C09K 19/52* | (2006.01) | |
| *B01J 20/24* | (2006.01) | |
| *B01J 20/30* | (2006.01) | |

(52) U.S. Cl.
CPC .............. *C01B 33/126* (2013.01); *B01J 20/10* (2013.01); *B01J 20/103* (2013.01); *B01J 20/24* (2013.01); *B01J 20/283* (2013.01); *B01J 20/28083* (2013.01); *B01J 20/305* (2013.01); *B01J 20/3078* (2013.01); *C01B 33/124* (2013.01); *C09K 19/02* (2013.01); *C09K 19/3819* (2013.01); *C09K 19/52* (2013.01); *C01P 2006/16* (2013.01); *C09K 2019/521* (2013.01)

(58) Field of Classification Search
CPC ........................................................ B01D 53/56
USPC .................................................... 423/239.1
See application file for complete search history.

(56) References Cited

U.S. PATENT DOCUMENTS

| 5,108,725 | A | 4/1992 | Beck |
|---|---|---|---|
| 2004/0024076 | A1 | 2/2004 | Davis |
| 2009/0142565 | A1 | 6/2009 | Takahashi |
| 2011/0248214 | A1 | 10/2011 | MacLachlan |

FOREIGN PATENT DOCUMENTS

| EP | 1748032 | 1/2007 |
|---|---|---|
| EP | 2030949 | 3/2009 |
| WO | 9111390 | 8/1991 |
| WO | 2010110998 | 9/2010 |
| WO | 2010141426 | 12/2010 |

OTHER PUBLICATIONS

Davis, M.E. Ordered porous materials for emerging applications. Nature 417, 813-821 (2002).
Ying, J.Y., Mehnert, C.P. & Wong, M.S. Synthesis and applications of supramolecular-templated mesoporous materials. Angew. Chem. Int. Ed. 38, 56-77 (1999).
Kresge, C.T., Leonowicz, M.E, Roth, W.J., Vartuli, J.C. & Beck, J.S. Ordered mesoporous molecular sieves synthesized by a liquid-crystal template mechanism. Nature 359, 710-712 (1992).
Zhao, D.Y., Feng, J.L., Huo, Q.S., Melosh, N., Fredrickson, G.H., Chmelka, B.F. & Stucky, G.D. Triblock copolymer syntheses of mesoporous silica with periodic 50 to 300 angstrom pores. Science 279, 548-552 (1998).
Tanev, P.T. & Pinnavaia, T.J. Mesoporous silica molecular sieves prepared by ionic and neutral surfactant templating: A comparison of physical properties. Chem. Mater. 8, 2068-2079 (1996).

(Continued)

*Primary Examiner* — Edward Johnson
(74) *Attorney, Agent, or Firm* — Norton Rose Fulbright Canada LLP

(57) ABSTRACT

In this invention, we disclose a method as well as silica and/or organosilica mesoporous materials obtained by templating using nanocrystalline cellulose and removal of the latter using acidic conditions. The resultant mesoporous silica materials are characterized by having high surface area with tunable iridescence resulting from the long-range chiral nematic organization. This invention is an improvement over the formation of composite materials formed with nanocrystalline cellulose (NCC) and silica, where the calcination of the materials led to removal of the cellulose and formation of a mesoporous silica material. Characteristically, the removal of the NCC template using acidic conditions differentiates the silica materials thus obtained in two ways: (1) It does not lead to as significant contraction of the materials as from calcination thereby giving access to materials with larger mesopores; and (2) it allows the formation of mesoporous chiral nematic compositions that include heat-sensitive components. This approach may be used to prepare the first example of a mesoporous organosilica material with a chiral nematic pore structure. Examples of possible applications of this material include optical filters, adsorbents, chiral stationary phases for chromatography, sensors, composite materials, membranes, and templates for creating other chiral materials.

12 Claims, 16 Drawing Sheets

(56) References Cited

OTHER PUBLICATIONS

Zhao, D.Y., Huo, Q.S., Feng, J.L., Chmelka, B.F. & Stucky, G.D. Nonionic triblock and star diblock copolymer and oligomeric surfactant syntheses of highly ordered, hydrothermally stable, mesoporous silica structures. J. Am. Chem. Soc. 120, 6024-6036 (1998).

Asefa, T., MacLachlan, M.J., Coombs, N. & Ozin, G.A. Periodic mesoporous organosilicas with organic groups inside the channel walls. Nature 402, 867-871 (1999).

Inagaki, S., Guan, S., Ohsuna, T. & Terasaki, O. An ordered mesoporous organosilica hybrid material with a crystal-like wall structure. Nature 416, 304-307 (2002).

Asefa, T., Kruk, M., MacLachlan, M.J., Coombs, N., Grondey, H., Jaroniec, M. & Ozin, G.A. Novel bifunctional periodic mesoporous organosilicas, BPMOs: Synthesis, characterization, properties and in-situ selective hydroboration-alcoholysis reactions of functional groups. J. Am. Chem. Soc. 123, 8520-8530 (2001).

Lu, Y., Fan, H., Doke, N., Loy, D.A., Assink, R.A., LaVan, D.A. & Brinker C.J. Evaporation-induced self-assembly of hybrid bridged silsesquioxane film and particulate mesophases with integral organic functionality. J. Am. Chem. Soc. 122, 5258-5261 (2000).

Burleigh, M.C., Markowitz, M.A., Jayasundera, S., Spector, M.S., Thomas, C.W. & Gaber, B.P. Mechanical and hydrothermal stabilities of aged periodic mesoporous organosilicas. J. Phys. Chem. B 107, 12628-12634 (2003).

Dujardin, E., Blaseby, M. & Mann, S. Synthesis of mesoporous silica by sol-gel mineralisation of cellulose nanorod nematic suspensions. J. Mater. Chem. 13, 696-699 (2003).

Thomas, A. & Antonietti, M. Silica nanocasting of simple cellulose derivatives: towards chiral pore systems with long-range order and chiral optical coatings. Adv. Funct. Mater. 13, 763-766 (2003).

Wang, W., Liu, R., Liu, W., Tan, J., Liu, W., Kang, H. & Huang, Y. Hierarchical mesoporous silica prepared from ethyl-cyanoethyl cellulose cholesteric liquid crystalline phase. J. Mater. Sci. 45, 5567-5573 (2010).

Shopsowitz, K.E., Qi, H., Hamad, W.Y. & MacLachlan M.J. Free-standing mesoporous silica films with tunable chiral nematic structures. Nature 468, 422-425 (2010).

Mosier, N., Wyman, C., Dale, B., Elander, R., Lee, Y.Y., Holtzapple, M. & Ladisch M. Features of promising technologies for pretreatment of lignocellulosic biomass. Bioresource Technology 96, 673-686 (2005).

Saeman, J.F. Kinetics of wood saccharification-hydrolysis of cellulose and decomposition of sugars in dilute acid at high temperature. Industrial and Engineering Chemistry 37, 43-52 (1945).

Amarasekara, A.S. & Owereh, O.S. Hydrolysis and decomposition of cellulose in Bronsted acidic ionic liquids under mild conditions. Ind. Eng. Chem. Res. 48, 10152-10255 (2009).

Supplementary European Search Report—EP 12781937.3 dated Oct. 8, 2014.

Qi, H. et al., Chiral Nematic Assemblies of Silver Nanoparticles in Mesoporous Silica Thin Films, J. Am. Chem. Soc., =Feb. 28, 2011, vol. 133, p. 3728-3731.

PROCESS FOR PREPARATION OF MESOPOROUS SILICA AND ORGANOSILICA MATERIALS

CROSS-REFERENCE TO RELATED APPLICATION

This application is a National Phase entry of PCT/CA2012/000457 filed May 11, 2012, in which the United States of America was designated and elected, and which remains pending in the International phase until Nov. 12, 2013, which application in turn claims priority under 35 USC 119(e) from U.S. Provisional application Ser.No. 61/485,207 filed May 12, 2011. This application is related to U.S. application 13/076,469 filed Mar. 31 2011, published as US 2011-0248214 on Oct. 13, 2011 and the contents thereof are incorporated herein by reference.

TECHNICAL FIELD

The present invention relates to mesoporous siliceous materials and a process for their preparation, more especially the invention provides a new method for removing cellulose, especially nanocrystalline cellulose from silica or organo-silica composites using strong acids. This gives access to novel mesoporous silica and organosilica materials that may be obtained as free-standing films with or without chiral nematic structures.

BACKGROUND ART

Porous materials have been extensively studied and are used for a wide range of applications, including as ion exchangers and drying agents.[1,2] Porous materials constructed using organic templates do not usually have accessible porosity until the template is removed. For example, mesoporous silica (MCM-41), first reported in 1992, is prepared by templating the condensation of silica around a lyotropic liquid crystalline phase followed by calcination of the template.[3-5] Besides calcination, other methods have been used to remove neutral or charged organic or inorganic templates from inside of a porous silica-based material, including acid-extraction and solvent-extraction.[6-8] In particular, methods such as solvent extraction and acid-extraction are used to prepare mesoporous organosilicas since the organic group in the wall of the material cannot usually withstand the high temperature conditions of the calcination.[9-11] Mesoporous organosilica materials can exhibit unique properties compared to mesoporous silica such as enhanced hydrothermal stability, chemical stability, and mechanical properties.[12,13] This class of materials is therefore of great interest for a variety of potential applications.

Cellulose has been used in various forms to construct cellulose-silica composites.[14-16] Where it has been removed to afford a porous structure, the cellulose has been calcined under air or oxygen. We recently reported a new type of silica-cellulose composite material where nanocrystalline cellulose is organized in a chiral nematic assembly inside of the composite.[17] After calcination, the nanocrystalline cellulose is decomposed, leaving a porous, chiral nematic silica material. One drawback of this method is that the pores in the material are smaller than the diameter of the individual NCC crystallites owing to condensation and collapse of the pores during calcination. Another significant drawback is that it does not allow for the incorporation of organic groups or other temperature-sensitive groups into the silica walls as they generally will thermally decompose at the temperatures required to degrade cellulose.

The decomposition of cellulose by a strong acid (e.g., HCl, $H_2SO_4$) in water, ionic liquids and other solvents has been extensively studied.[18-20] Much of this research has been aimed at converting cellulose to glucose, which may then be converted to ethanol for use as a biofuel. Under these circumstances the conditions must be selected very carefully to avoid the formation of other byproducts of cellulose decomposition. Acid-catalyzed hydrolysis of cellulose has not been applied to the removal of cellulose from silica-cellulose or organosilica-cellulose composite materials, where it can generate properties distinct from those where the cellulose was calcined. In this case, the specific degradation products of cellulose are relatively unimportant so long as the cellulosic material is effectively removed from the silica or organosilica network without structural damage to the network.

DISCLOSURE OF THE INVENTION

This invention seeks to provide new siliceous mesoporous materials.

This invention also seeks to provide a process for preparing siliceous mesoporous materials.

In accordance with one aspect of the invention there is provided a process of producing a mesoporous siliceous material comprising: acid hydrolysis of cellulose in a siliceous composite selected from the group consisting of silica/nanocrystalline cellulose composites and organosilica/nanocrystalline cellulose composites to produce a mesoporous siliceous material from which nanocrystalline cellulose has been removed by said acid hydolysis.

In accordance with another aspect of the invention there is provided a mesoporous siliceous material selected from the group consisting of mesoporous silica and mesoporous organosilica derived from a composite comprising a siliceous matrix surrounding a skeleton of NCC crystals, said mesoporous siliceous material having a mesoporous siliceous matrix with mesopores occupying a volume corresponding to that of said skeleton in said composite.

In accordance with still another aspect of the invention there is provided a mesoporous siliceous material selected from the group consisting of mesoporous silica and mesoporous organosilica and having mesopores with a peak pore diameter of at least 5 nm.

In accordance with yet another aspect of the invention there is provided a mesoporous organosilica.

In accordance with still another aspect of the invention there is provided a mesoporous organosilica with chiral nematic organization.

DETAILED DESCRIPTION OF THE INVENTION

Figure 1:
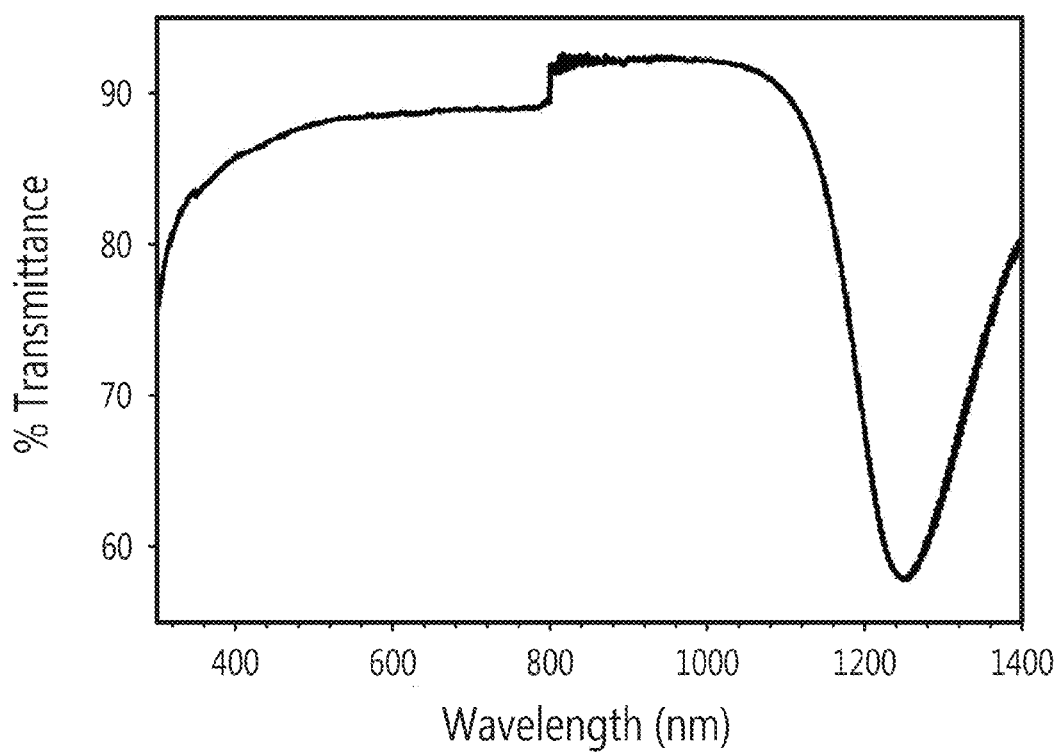
FIG. 1: is a UV-Vis-NIR transmission spectrum of NCC-silica composite from preparation 1.

A new process for generating mesoporous materials from organosilica/NCC and silica/NCC composites (where NCC is nanocrystalline cellulose) by removing the NCC using acidic solutions has been developed. This gives rise to mesoporous materials that may be obtained as free-standing films with chiral nematic organization. Compared to the prior art processes that use high temperature treatments to remove NCC, this process yields materials with larger mesopores. Furthermore, it gives access to the first examples of mesoporous organosilicas templated by NCC, which cannot generally be synthesized through calcination due to the thermal or oxidative sensitivity of the organic groups.

This process allows for a completely novel material to be synthesized, namely mesoporous organosilica templated by cellulose, which cannot be synthesized by calcination of an organosilica/NCC composite material. Furthermore the process results in mesoporous siliceous materials exhibiting higher peak pore diameter as compared with corresponding mesoporous siliceous materials produced under conditions of calcination for removal of NCC. The mesoporous materials may be produced as films which may have chiral or achiral structure. In the case of films with chiral nematic structure, such structure results in iridescence, the color of which may be tuned by changing the ratio of organosilica precursor to NCC. This provides the first example of mesoporous organosilicas with chiral nematic structures.

The invention also allows for preparation of silica-NCC and organosilica-NCC composites that do not have the chiral nematic structure, the acid treatment method described herein may be applied to such materials to afford porous silica or organosilica with or without chiral nematic organization. The combination of porosity and optical properties in these materials makes them interesting for a wide range of applications.

The invention employs a new method for the removal of cellulose from silica/NCC or organosilica/NCC composites using aqueous acids that leads to mesoporous silica or organosilica materials. These new mesoporous materials have significantly different properties compared to the corresponding materials obtained when the NCC is removed by calcination. This process enables the development of materials with temperature-sensitive components that would be degraded during thermal decomposition of the NCC. Also, it enables access to different pore sizes than those obtained from thermal decomposition of NCC. In particular, by utilizing acid hydrolysis of NCC from chiral nematic organosilica/NCC composites, novel mesoporous organosilica materials with chiral nematic structures can be prepared. Nitrogen adsorption isotherms show that the materials obtained have high surface areas and porosity. These novel materials are attractive for many practical applications, including catalyst supports (possibly including enantioselective transformations), stationary phases (for separation of chiral or achiral substances), optical filters, sensors, insulators, adsorbents, membranes, and as templates for other chiral nanomaterials. The invention provides the process to remove NCC from silica/NCC or organosilica/NCC composites, as well as the novel materials obtained after removal of the NCC, including both chiral nematic and achiral structures.

The acid hydroysis in the process of the invention is typically carried out with maintenance of pores of a volume corresponding to the volume of the composite occupied by the nanocrystalline cellulose (NCC). In particular the composite comprises a siliceous matrix surrounding a skeleton of NCC crystals in which the crystals occupy a volume in the composite defining potential mesopores, i.e. the mesopores left after removal of the cellulose by the acid hydrolysis.

In particular the mesopores have a peak pore diameter higher than that of a corresponding mesoporous siliceous material produced by calcination of cellulose of the composite and more especially have mesopores with a peak pore diameter of at least 5 nm, and typically 5 to 15 nm.

The acid hydrolysis is typically carried out with a concentrated acid, for example hydrochloric acid, sulphuric acid, nitric acid or trifluoromethanesulfonic acid. The acid concentration should generally be greater than 3M and more usually greater than 6M. In the case of hydrochloric acid it is especially preferred to have a concentration of 10 to 12M and more especially about 12M. In the case of sulphuric acid a concentration of 4M to 8M and especially about 6M is preferred.

Nanocrystalline cellulose (NCC) is extracted as a colloidal suspension by acid hydrolysis of cellulosic materials, derived from sources such as bacteria, cotton, and wood pulp.

NCC is made from cellulose, a linear polymer of β(1→4) linked D-glucose units, the chains of which arrange themselves to form crystalline and amorphous domains. The NCC is extracted by selectively hydrolyzing the amorphous regions leaving behind the highly crystalline NCC. NCC is characterized by high crystallinity (between 85 and 97%, typically greater than 95%) approaching the theoretical limit of the cellulose chains.

Colloidal suspensions of cellulose crystallites form a chiral nematic structure upon reaching a critical concentration. The chiral nematic structure of NCC suspensions may be preserved upon evaporation, resulting in chiral nematic films where the helicoidal axis is oriented perpendicular to the surface of the films. These films are visibly iridescent when the helical pitch is on the order of the wavelengths of visible light.

A broad range of silica and organosilica precursors, e.g. of the general types $Si(OR^1)_4$, $Si(OR^1)_3R$, and $Si(OR^1)_3R^2Si(OR^3)_3$, and mixtures thereof in which each $R$, $R^1$ and $R^3$ may be the same or different and is typically a phenyl group ($C_6H_5$), a substituted phenyl group, an alkyl group, a branched alkyl group, a cycloalkane, or any similar organic component, and $R^2$ is a bridging organic component, such as 1,4-phenylene ($C_6H_4$), methylene ($CH_2$), ethylene ($CH_2CH_2$), propylene ($CH_2CH_2CH_2$), or any other linear or branched alkylene spacer (e.g., $(CH_2)_6$), may be condensed in the presence of NCC to form organosilica/NCC or silica/NCC composite materials. Under appropriate conditions, these composite materials may be obtained as free-standing or self-supporting films with long-range chiral nematic structures. The full synthesis and characterization of chiral nematic silica/NCC composite films has been described in U.S. patent application Ser. No. 13/076,469 filed Mar. 31, 2011, and the contents thereof are incorporated herein by reference. In the present invention, organosilica/NCC and silica/NCC composite materials such as are described in the aforementioned earlier US patent application are subjected to different acidic conditions in order to obtain mesoporous materials, which may be obtained as free-standing films with long-range chiral nematic structures.

Figure 2:
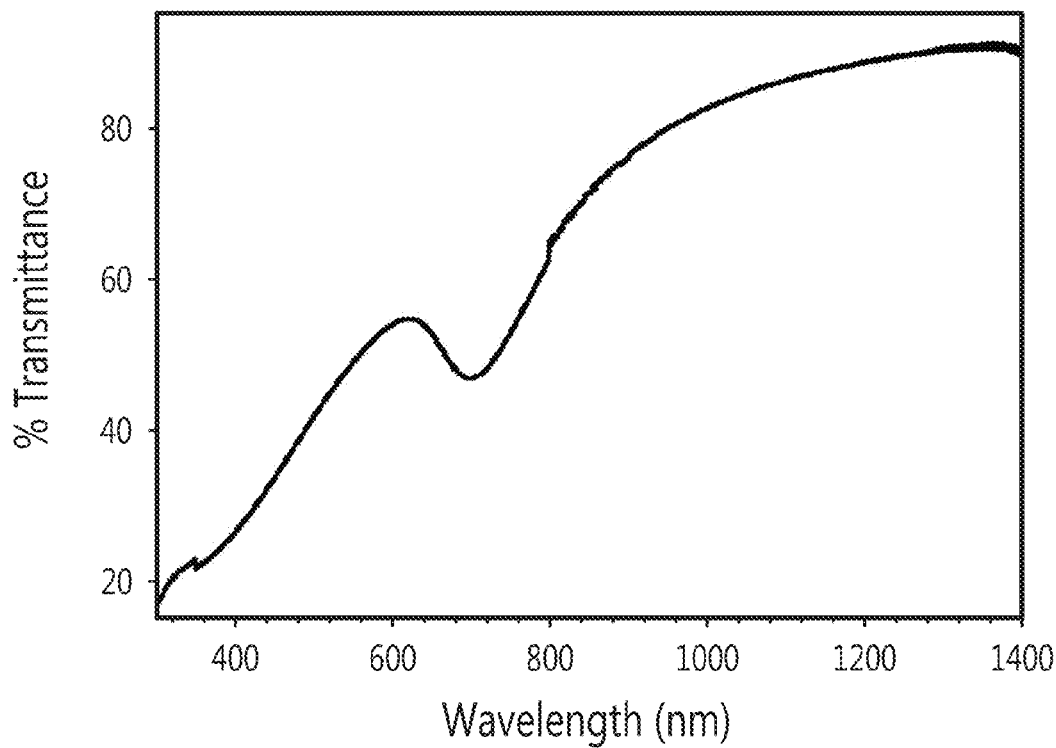
FIG. 2: is a UV-Vis-NIR transmission spectrum of silica from preparation 2.
Figure 3:
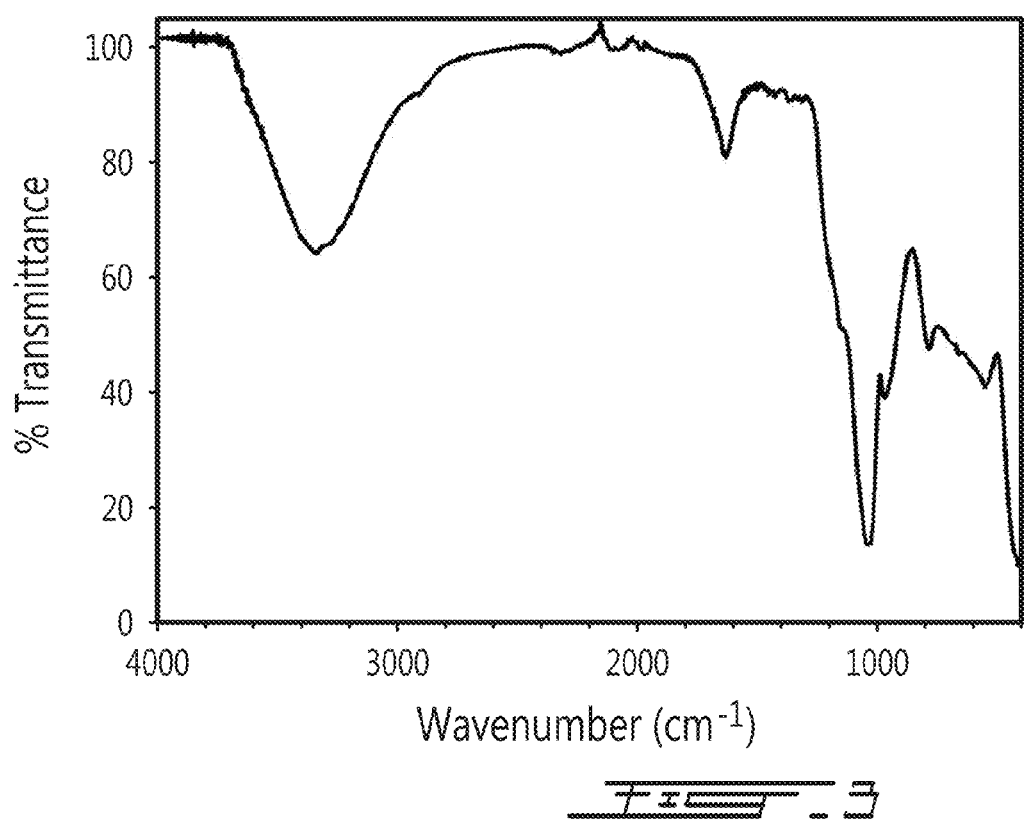
FIG. 3: is an IR spectrum of silica from preparation 2.
Figure 4:
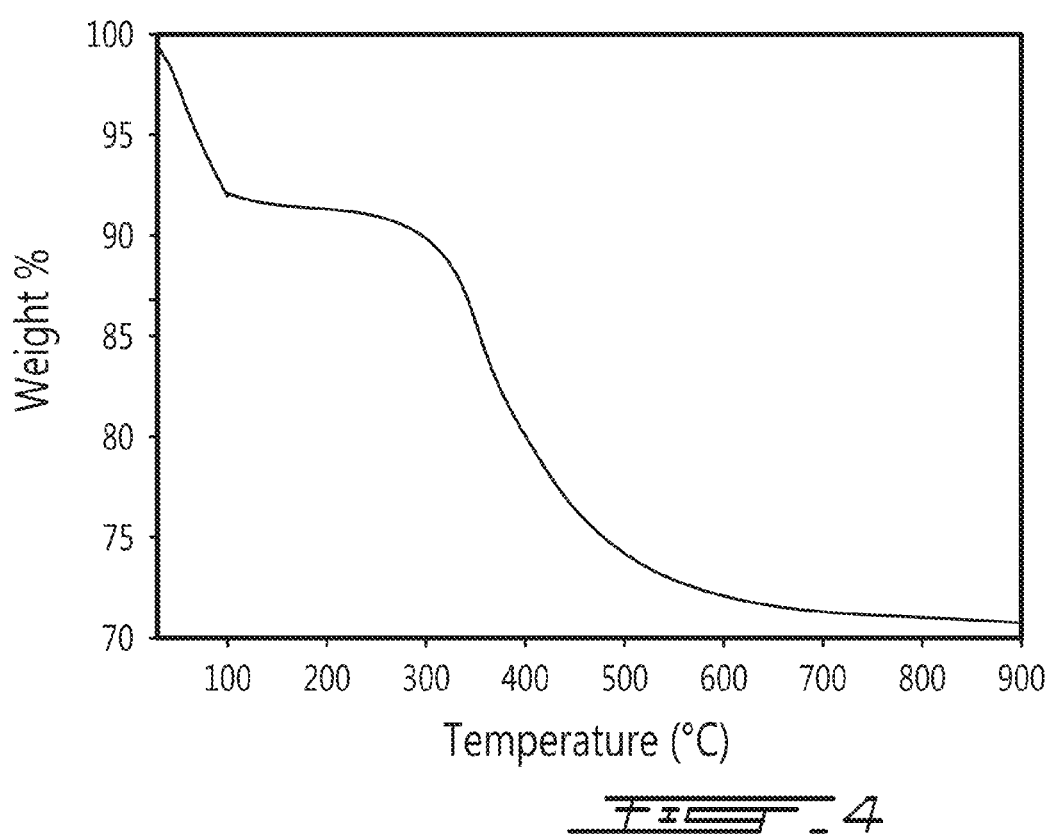
FIG. 4: is a graph of the thermogravimetric analysis (TGA) data of silica from preparation 2.
Figure 5:
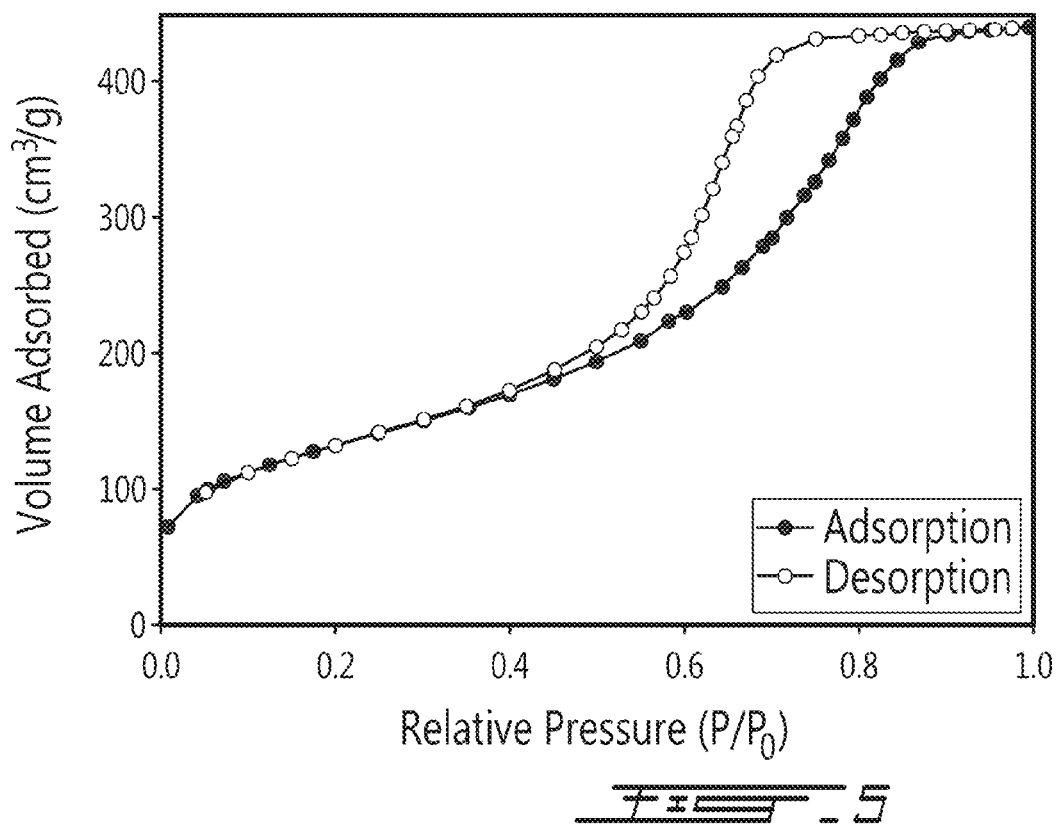
FIG. 5: is a plot of the $N_2$ adsorption-desorption isotherm of silica from preparation 2.
Figure 6:
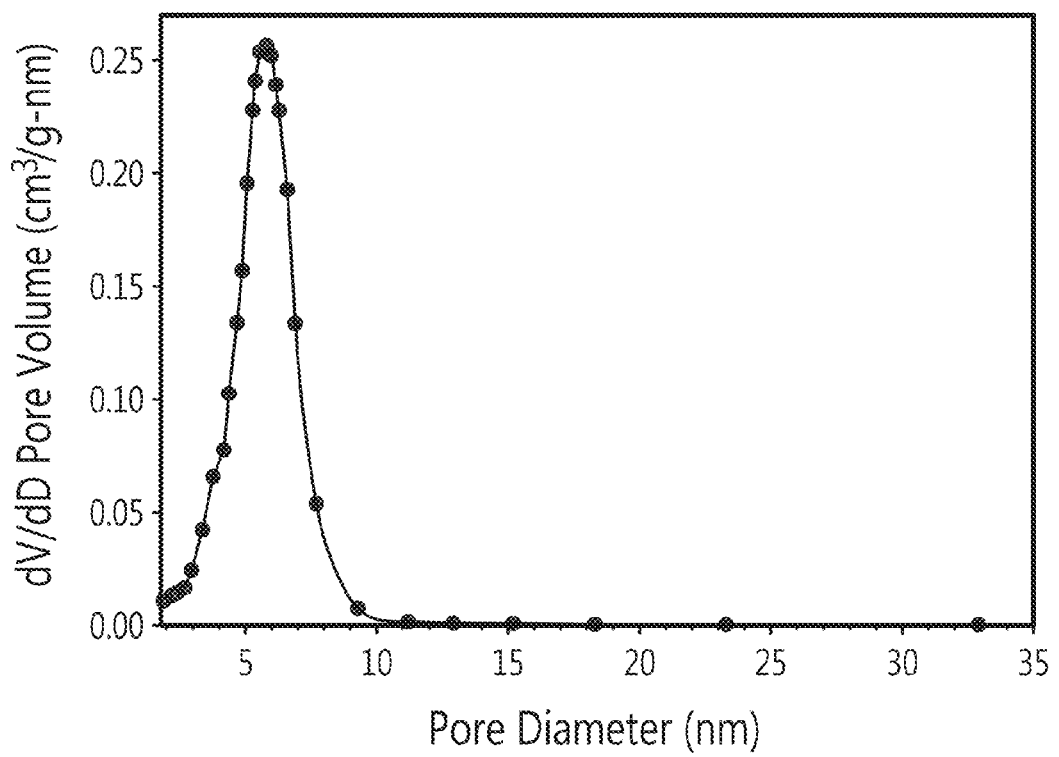
FIG. 6: is a plot of the BJH pore size distribution (desorption) of silica from preparation 2.

The removal of NCC from free-standing chiral nematic silica/NCC composite films (Preparation 1) may be successfully carried out with inorganic acids, for example hydrochloric acid, sulfuric acid, or nitric acid, or mixtures thereof. Treatment of the films in concentrated acid in water is typically at elevated temperatures in the range of 70° C. to 120° C. Acid hydrolysis with hydrochloric acid in water (12 M) at elevated temperatures (preferably >80° C.) and ambient pressure causes decomposition of the NCC within the composite films (when concentrated HCl is used at lower concentrations or temperatures, NCC degradation does not appear to occur). Free-standing mesoporous silica films are obtained after filtration and washing with water (Preparation 2). Initially colorless films with a reflectance peak (measured by UV-visible spectroscopy) at 1260 nm (FIG. 1) owing to the chiral nematic structure of the films appear light to dark brown after the HCl treatment due to the formation of insoluble cellulose decomposition products. A reflection peak is apparent in the dry films at 700 nm (FIG. 2) demonstrating that the chiral nematic structure is retained in the films after the acid treatment. The blue-shift in the reflectance peak is consistent with the decrease in refractive index that occurs due to cellulose removal. The infrared (IR) spectrum (FIG. 3) of the product obtained from Preparation 2 confirms that cellulose decomposition has occurred. However, as indicated by the brown color of the films and thermogravimetric analysis (TGA) (FIG. 4), residual organic material (22 wt. %) with a decomposition temperature of ~400° C. is still present in the material. Nitrogen adsorption measurements reveal a type IV isotherm with hysteresis demonstrating that the films are mesoporous (BET, Brunauer-Emmett-Teller model, surface area=470 m²/g, FIG. 5). Significantly, the pore diameter is considerably larger than the analogous materials prepared by calcination of the silica-NCC composite material. The BJH (Barret-Joyner-Halenda model) pore size distribution shows a peak pore diameter of 7 nm (FIG. 6). (The peak pore diameter for samples prepared directly by calcination is typically <4 nm.)

Figure 7:
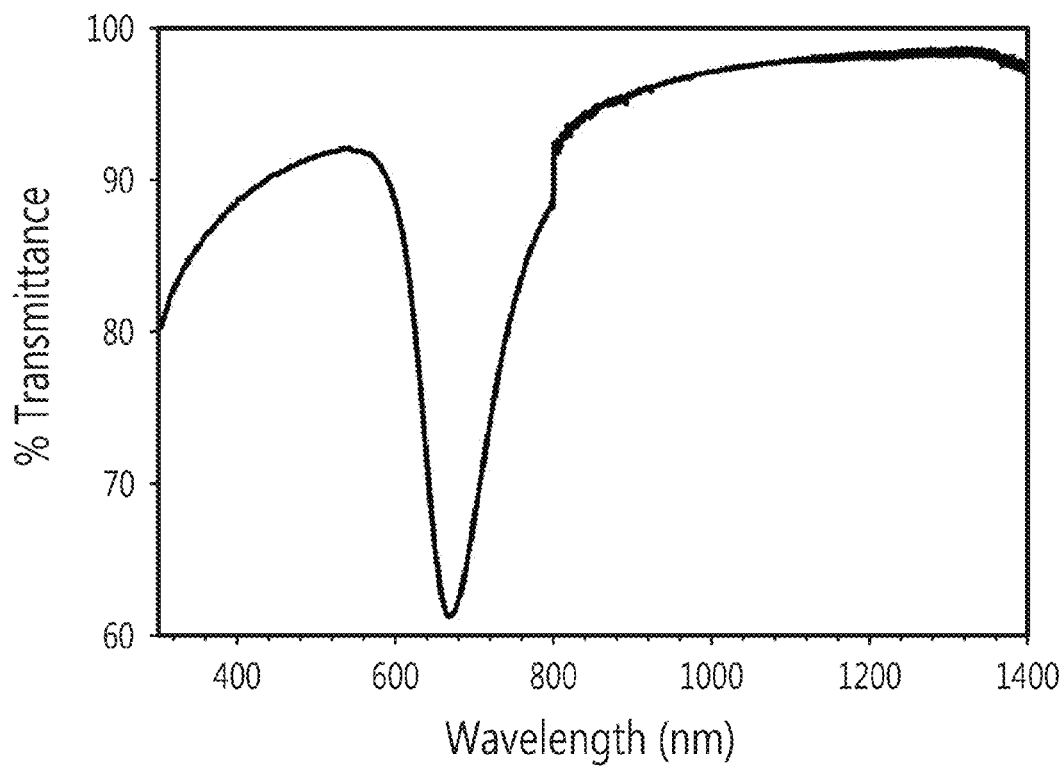
FIG. 7: is a UV-Vis-NIR transmission spectrum of silica from preparation 3.
Figure 8:
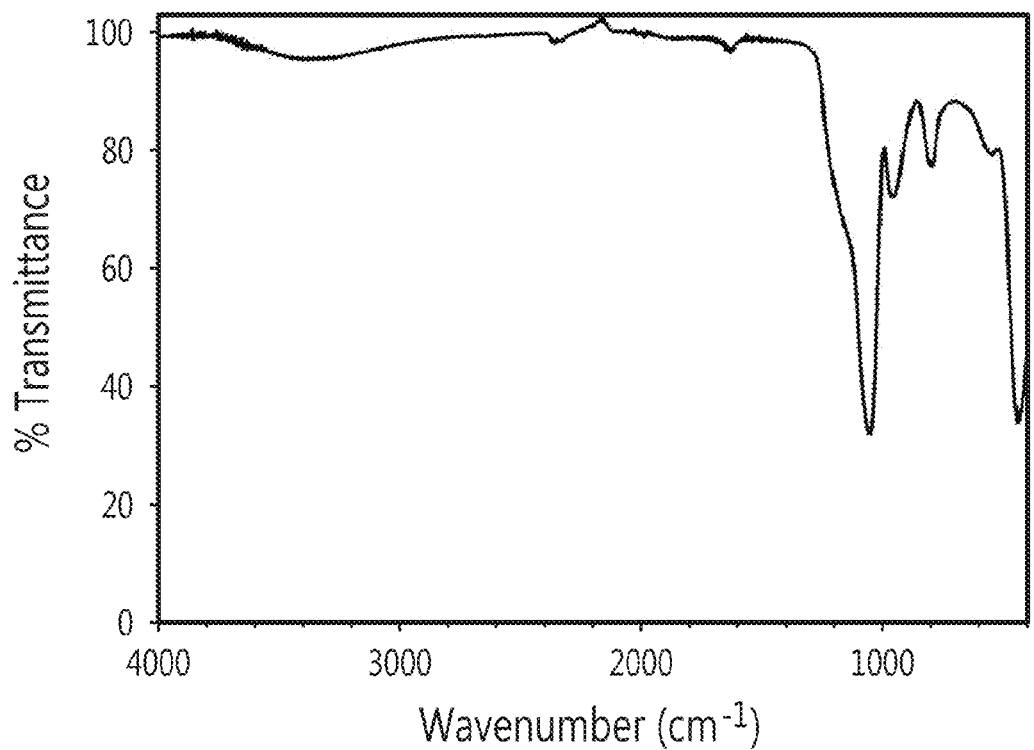
FIG. 8: is an IR spectrum of silica from preparation 3.
Figure 9:
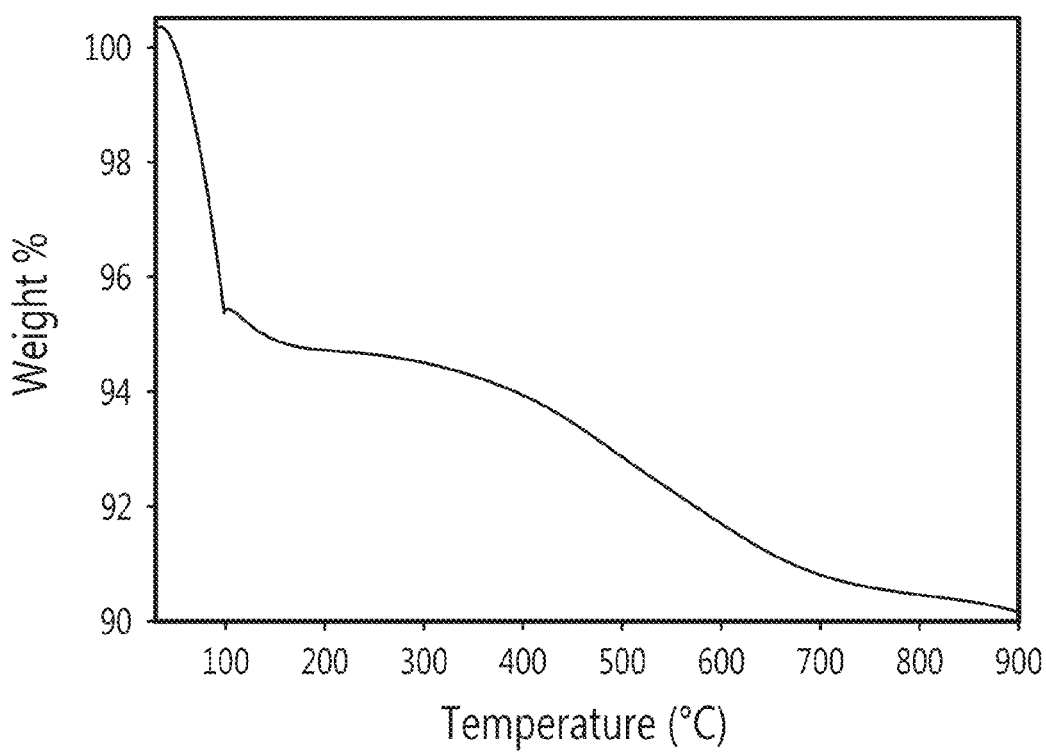
FIG. 9: is a graph of the TGA data of silica from preparation 3.
Figure 10:
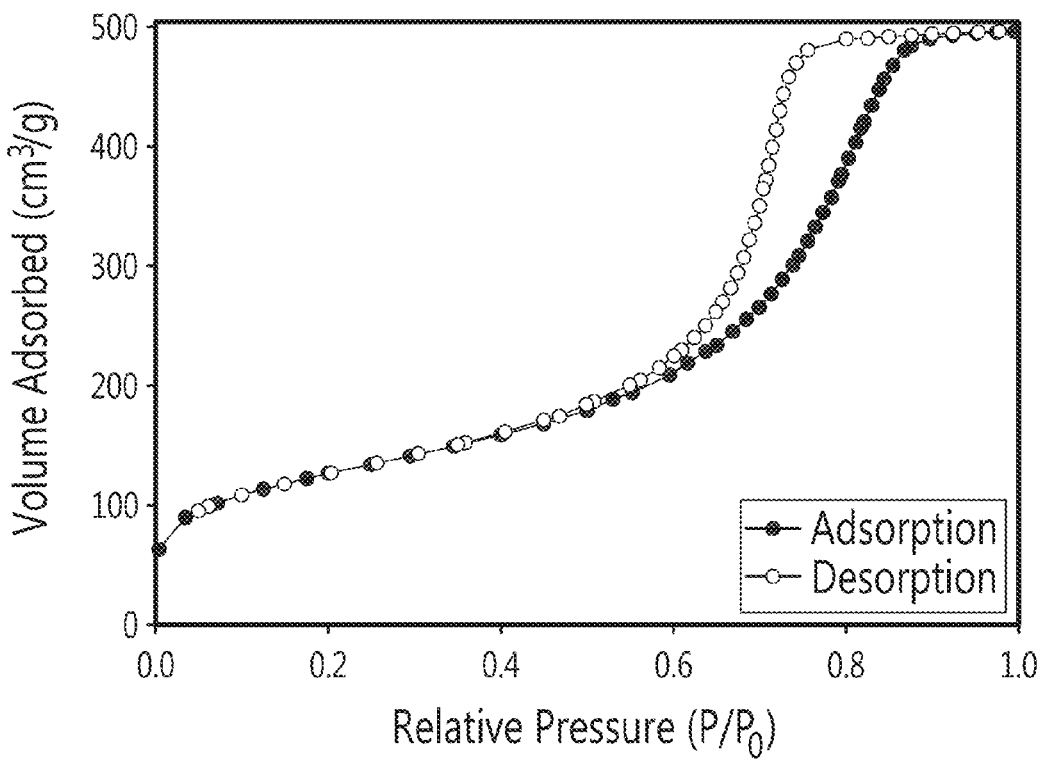
FIG. 10: is a plot of the $N_2$ adsorption-desorption isotherm of silica from preparation 3.
Figure 11:
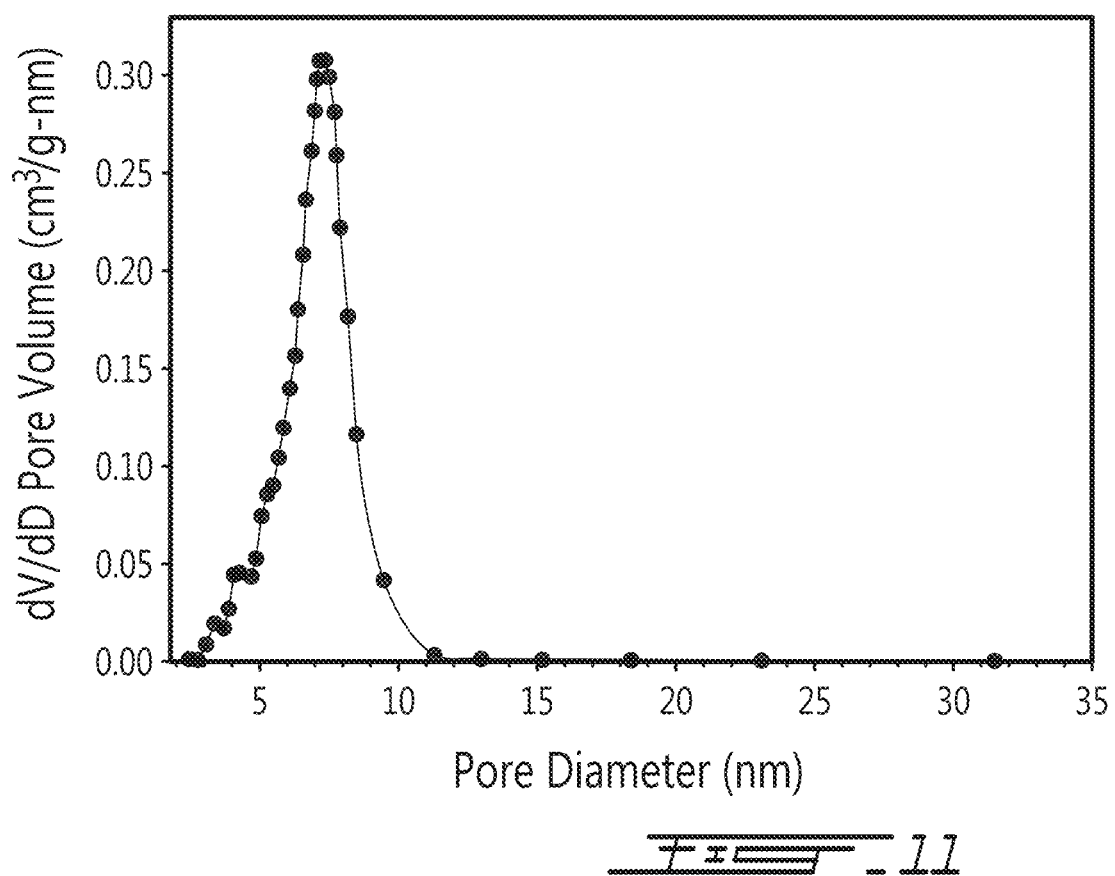
FIG. 11: is a plot of the BJH (Barret-Joyner-Halenda model) pore size distribution (desorption) of silica from preparation 3.
Figure 12:
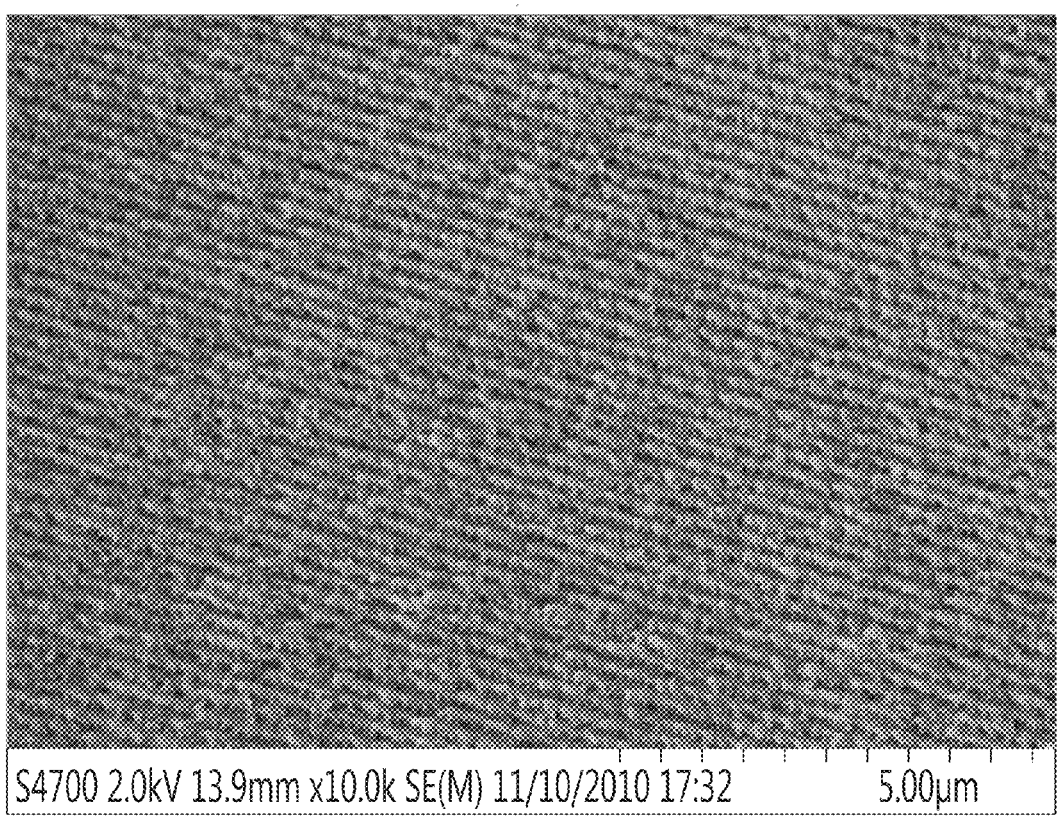
FIG. 12: is an SEM image of silica from preparation 3.
Figure 13:
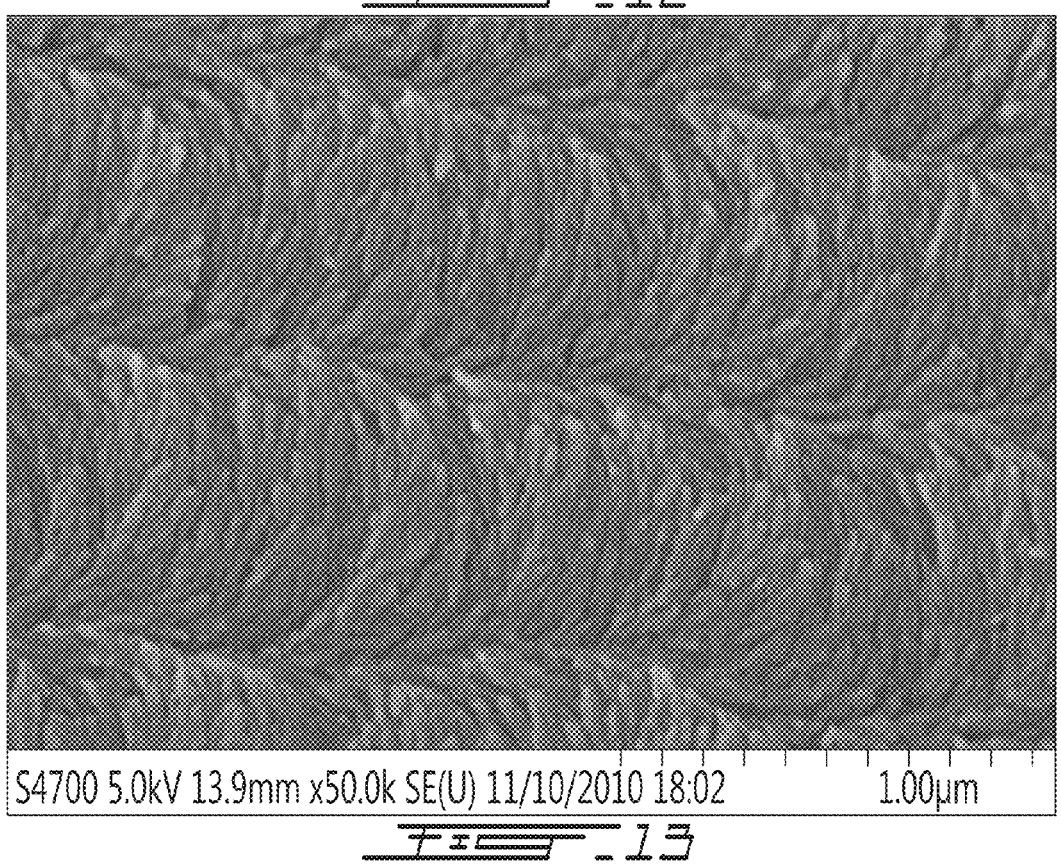
FIG. 13: is an SEM image of silica from preparation 3 at higher magnification.

The residual organic material may be removed from the films using oxidizing conditions (Preparation 3). When the brown mesoporous films are placed in a 4:1 mixture of sulfuric acid and hydrogen peroxide (30% in water), the color rapidly disappears. After washing the films with water and drying, the films regain their iridescence and show a reflectance peak at 680 nm (FIG. 7) that is attributed to the chiral nematic structure. The reflectance peak is located at essentially the same position that was observed before the oxidizing treatment; however, it is much more distinct due to the removal of the brown organic contaminants. IR spectroscopy (FIG. 8) and TGA (FIG. 9) confirm that the oxidizing treatment is able to successfully remove the residual cellulose decomposition products from the films. Elemental analysis reveals only trace amounts of carbon after the oxidizing treatment (<0.3 wt. %). Nitrogen adsorption shows that this treatment does not substantially affect the porosity of the materials, with the isotherm (FIG. 10) and BJH pore size distribution (FIG. 11) essentially unchanged. The specific pore volume is slightly increased, which is consistent with the removal of residual organic material from the mesopores. Scanning electron microscopy (SEM) provides further evidence that long range chiral nematic order is maintained in the mesoporous silica obtained using Preparation 3 (FIG. 12). At higher magnification the rod-like morphology of NCC imprinted into the silica (FIG. 13) is observed. The mesoporous silica is therefore an accurate replica of the NCC template. This demonstrates that this procedure is able to selectively remove NCC without causing structural damage to the silica.

Figure 14:
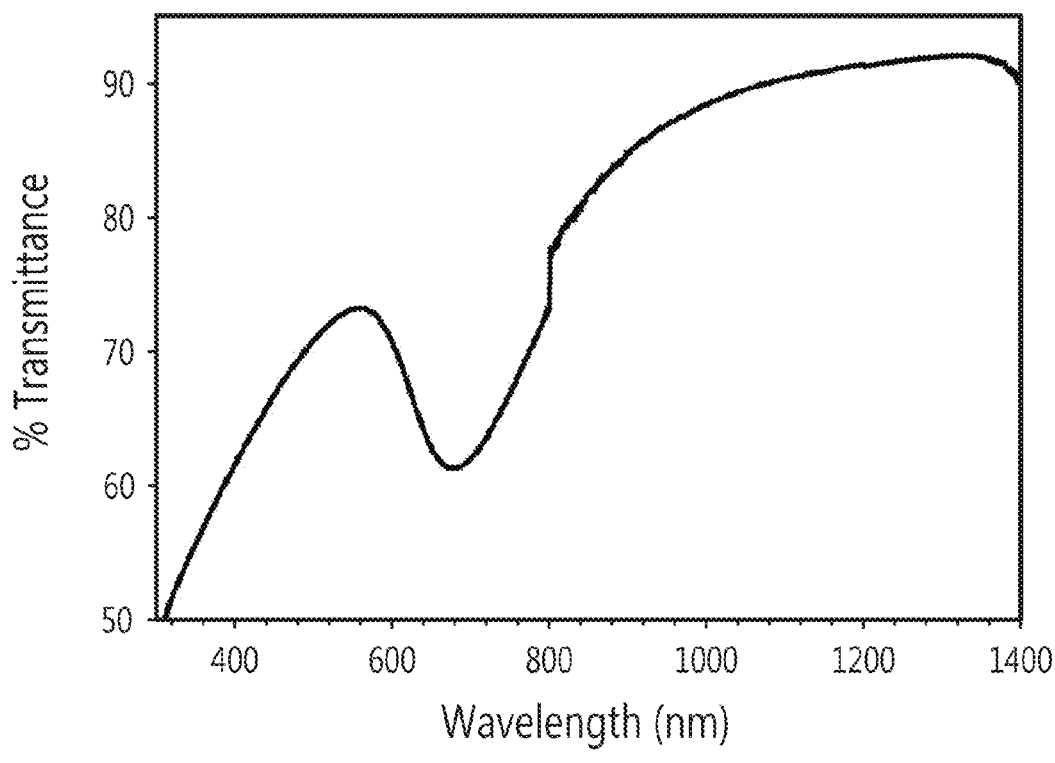
FIG. 14: is a UV-Vis-NIR transmission spectrum of silica from preparation 4.
Figure 15:
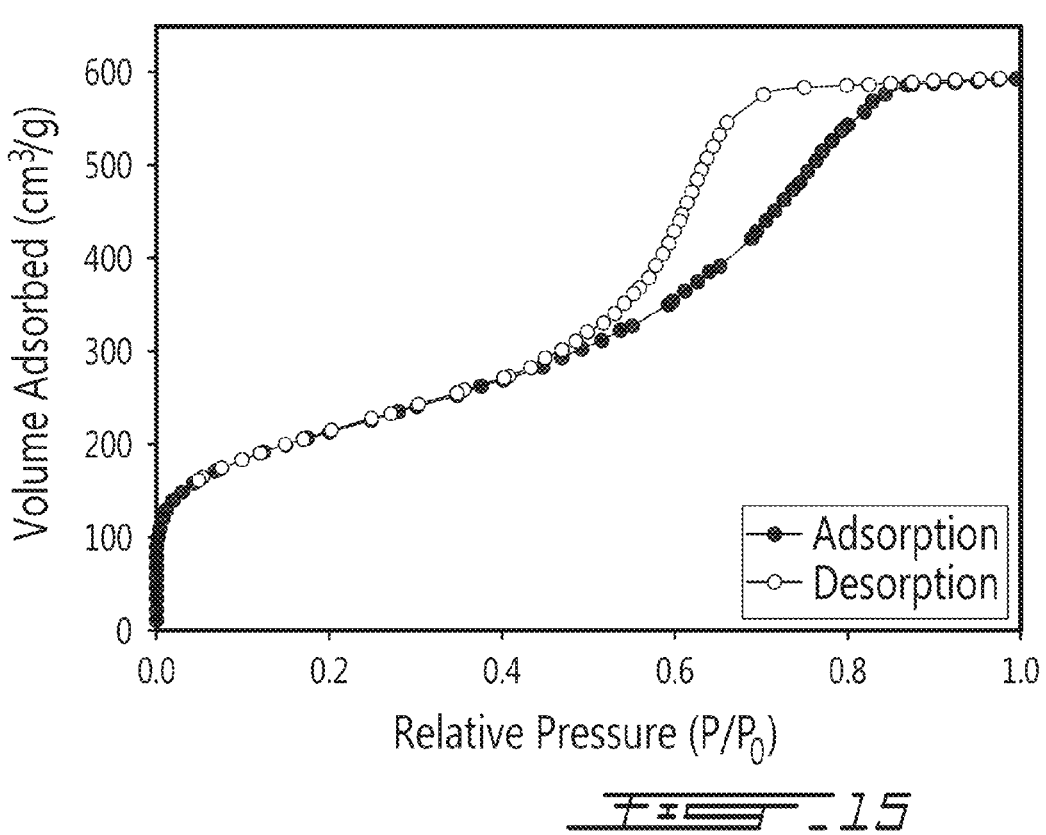
FIG. 15: is a plot of the $N_2$ adsorption-desorption isotherm of silica from preparation 4.
Figure 16:
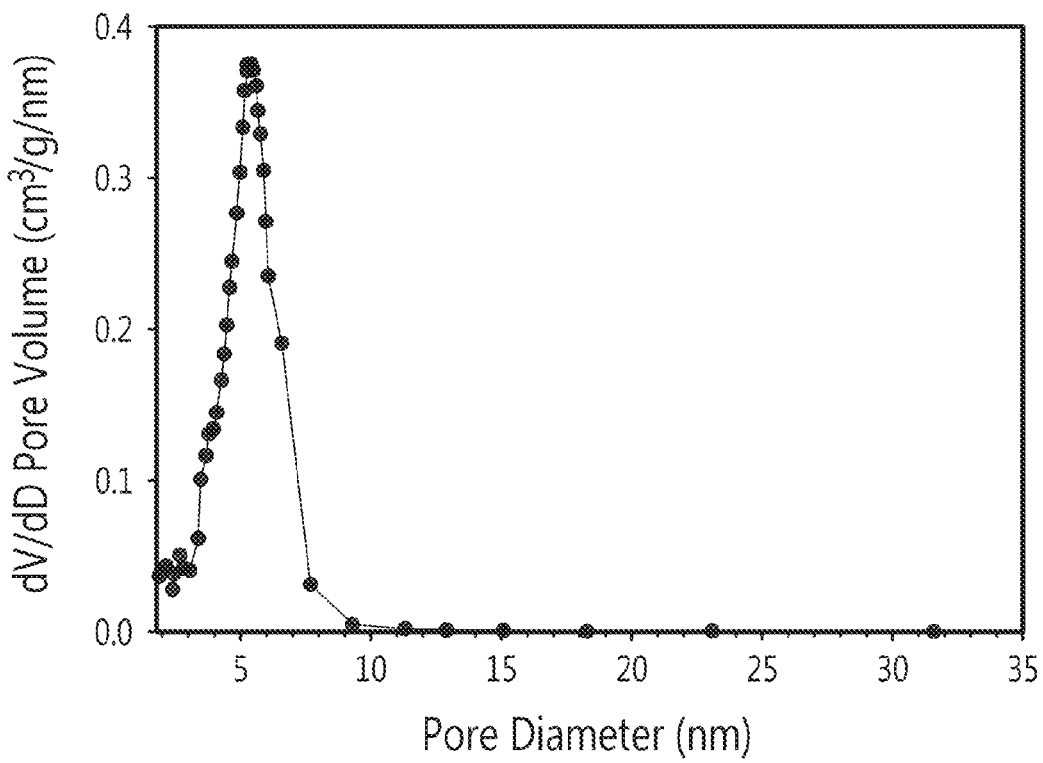
FIG. 16: is a plot of the BJH pore size distribution (desorption) of silica from preparation 4.
Figure 17:
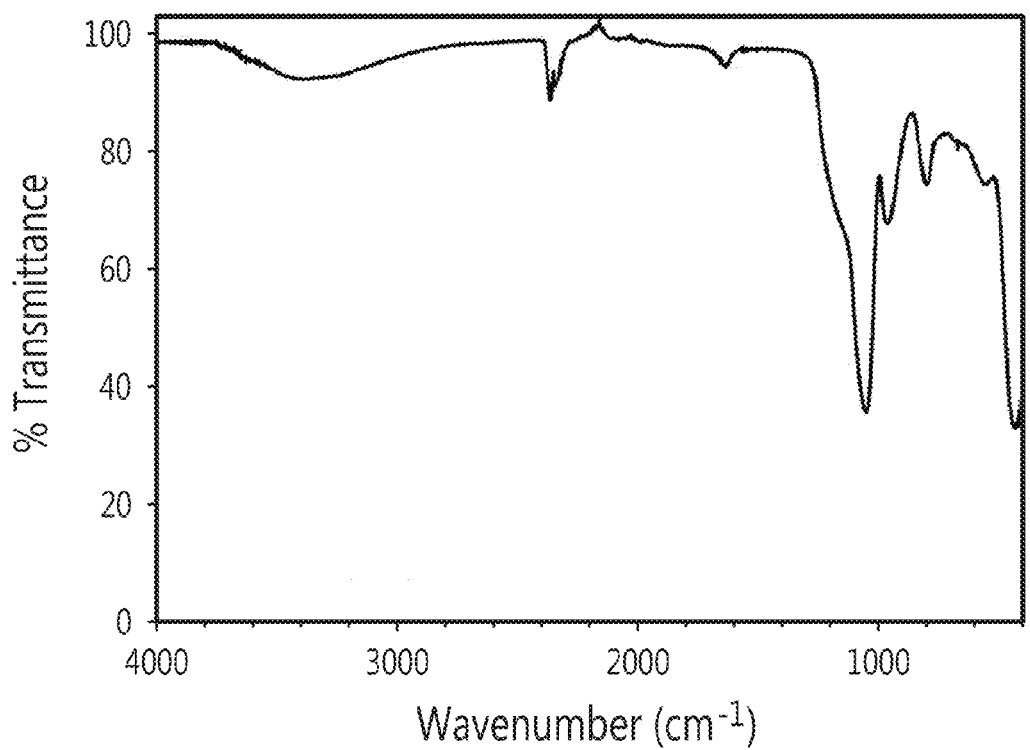
FIG. 17: is a IR spectrum of silica from preparation 4.
Figure 18:
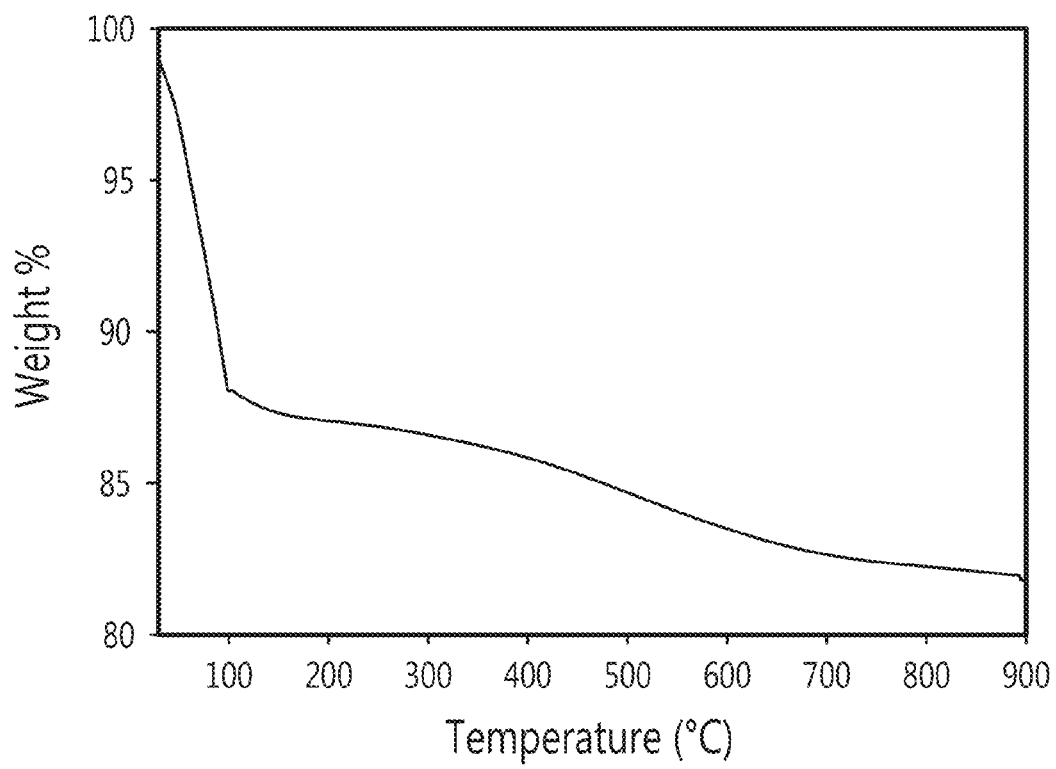
FIG. 18: is a graph of the TGA data of silica from preparation 4.

Sulfuric acid may also be employed to remove NCC from the composite films. Treatment of the composite films in 6-9 M sulfuric acid at >80° C. (Preparation 4) also results in slightly brown mesoporous silica films. The reflection peak observed in the UV-vis spectrum (690 nm, FIG. 14) is very similar to that observed for preparations 2 and 3; however, the porosity (FIGS. 15-16) measured for Preparation 4 is somewhat different. While the peak BJH pore diameter is very similar (~7 nm) the BET surface area (750 m²/g) is considerably higher than that measured for preparations 2 and 3. IR spectroscopy (FIG. 17) and TGA (FIG. 18) reveal that considerably less residual cellulosic decomposition products remain in the films compared to when concentrated HCl is used. Sulfuric acid/hydrogen peroxide can also be successfully used to completely remove any remaining insoluble cellulosic decomposition products from Preparation 4.

Figure 19:
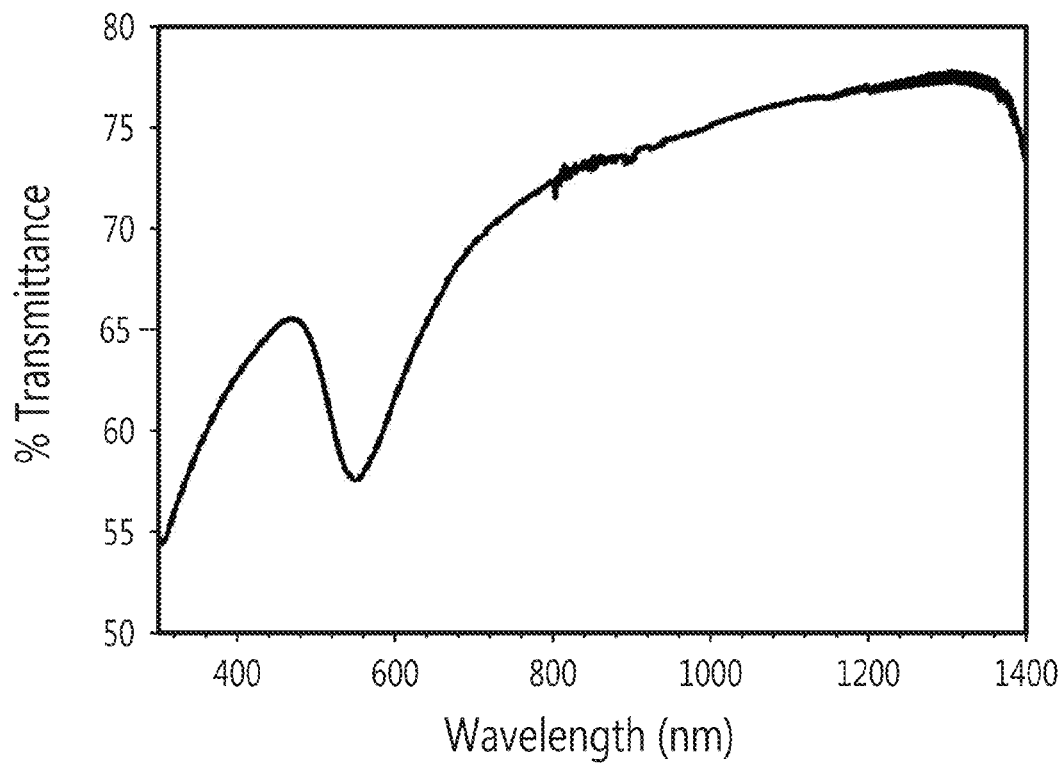
FIG. 19: is a UV-Vis-NIR transmission spectrum of silica from preparation 5.
Figure 20:
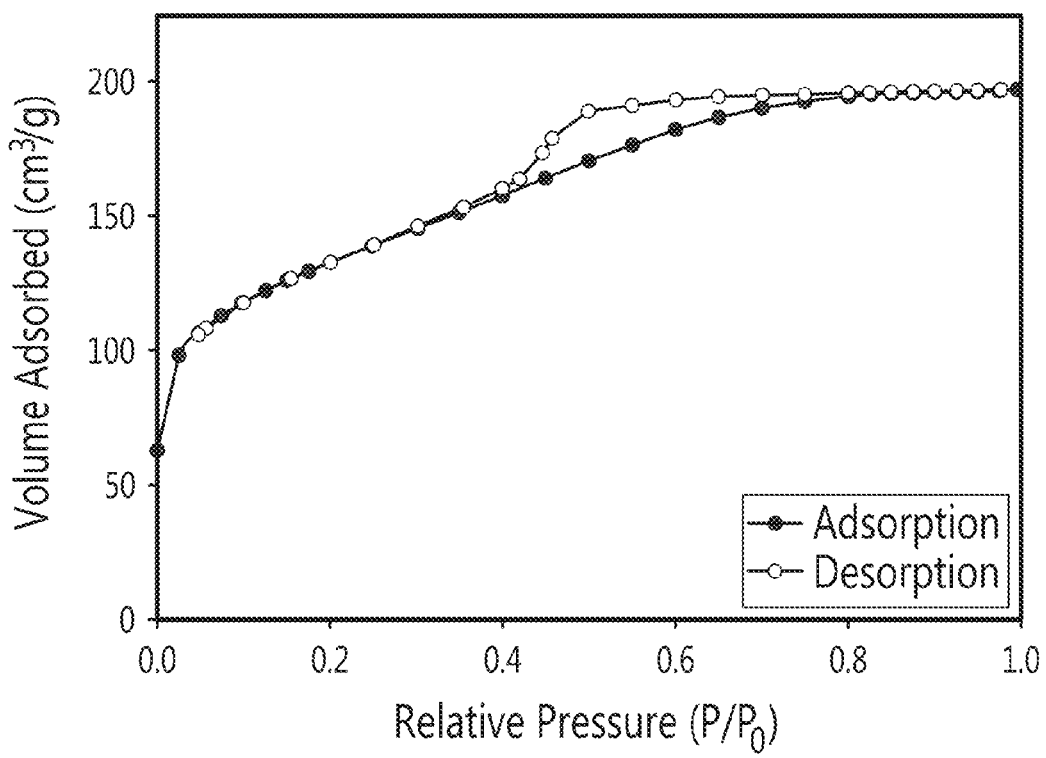
FIG. 20: is a plot of the $N_2$ adsorption-desorption isotherm of silica from preparation 5.
Figure 21:
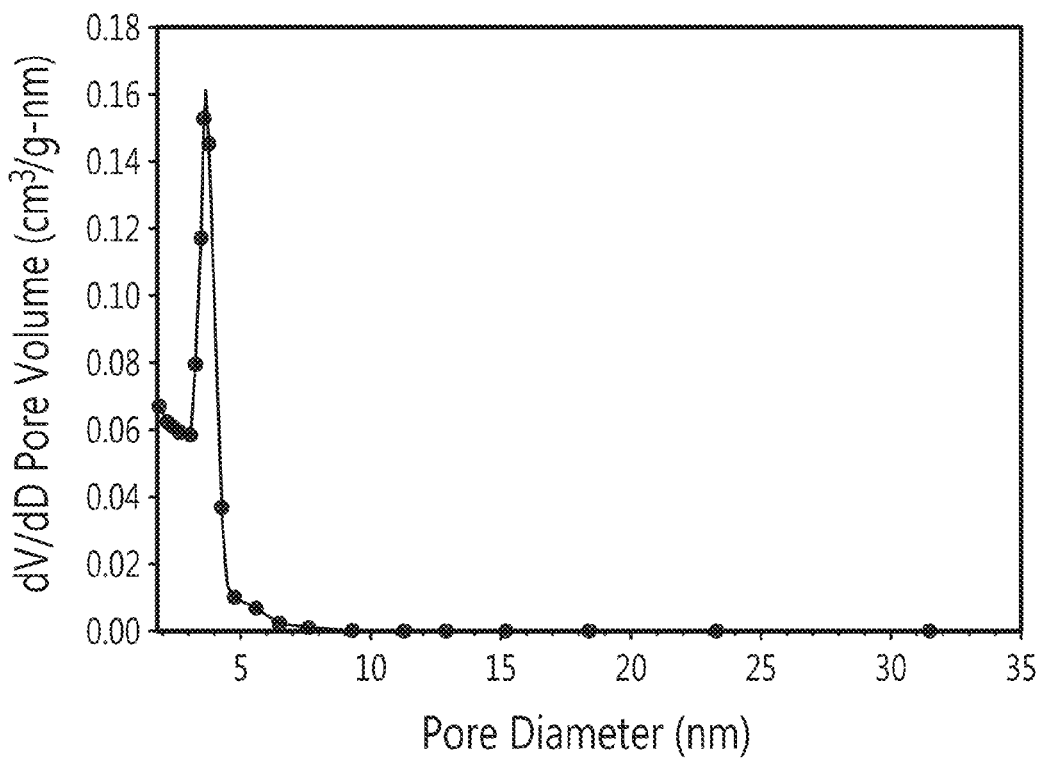
FIG. 21: is a plot of the BJH pore size distribution (desorption) of silica from preparation 5.

Concentrated nitric acid at 85° C. (Preparation 5) also removes NCC from the composite films. However, the reflectance peak (from the chiral nematic structure) and porosity measured for this sample are considerably different than those measured for Preparations 2, 3, and 4. The reflectance peak for Preparation 5 is blue-shifted compared to Preparations 2 and 4 and occurs at 560 nm (FIG. 19). The BET surface area measured for the material obtained from Preparation 5 is still high (450 m²/g), but the shape of the $N_2$ adsorption/desorption isotherm (type I/1V hybrid) indicates that there is a large micropore contribution to the surface area (FIG. 20). The BJH pore size-distribution gives a sharp peak at 3.5 nm (FIG. 21), which is approximately half the diameter of those calculated for Preparations 2-4. It therefore appears that in contrast to hydrochloric acid and sulphuric acid, nitric acid causes structural damage to the mesoporous silica framework. This may be avoidable by adjusting the concentration and temperature employed in the procedure.

Figure 22:
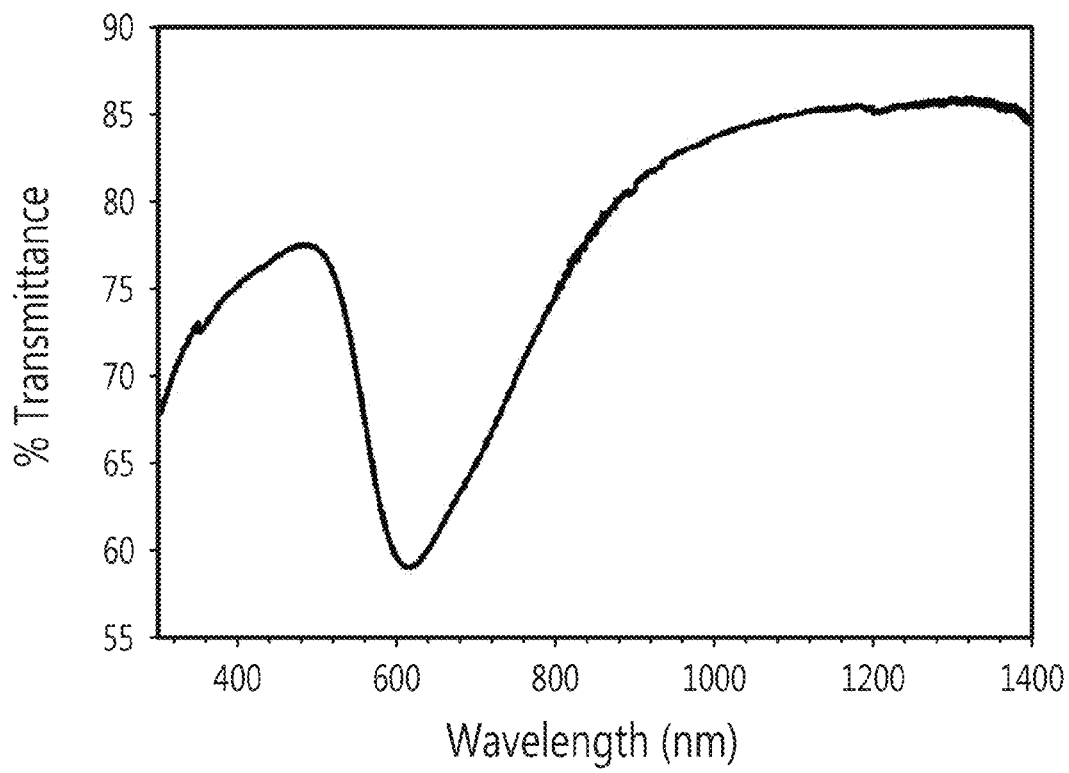
FIG. 22: is a UV-Vis-NIR transmission spectrum of organosilica-NCC composite from preparation 6.
Figure 23:
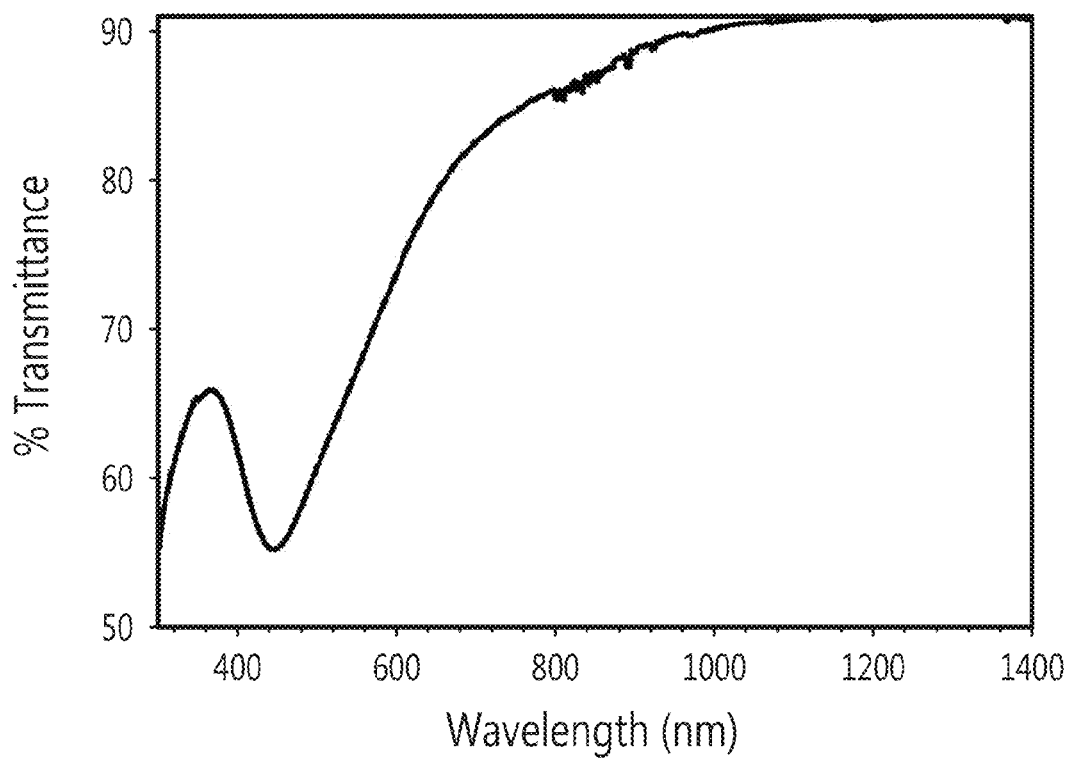
FIG. 23: is a UV-Vis-NIR transmission spectrum of organosilica from preparation 7.
Figure 24:
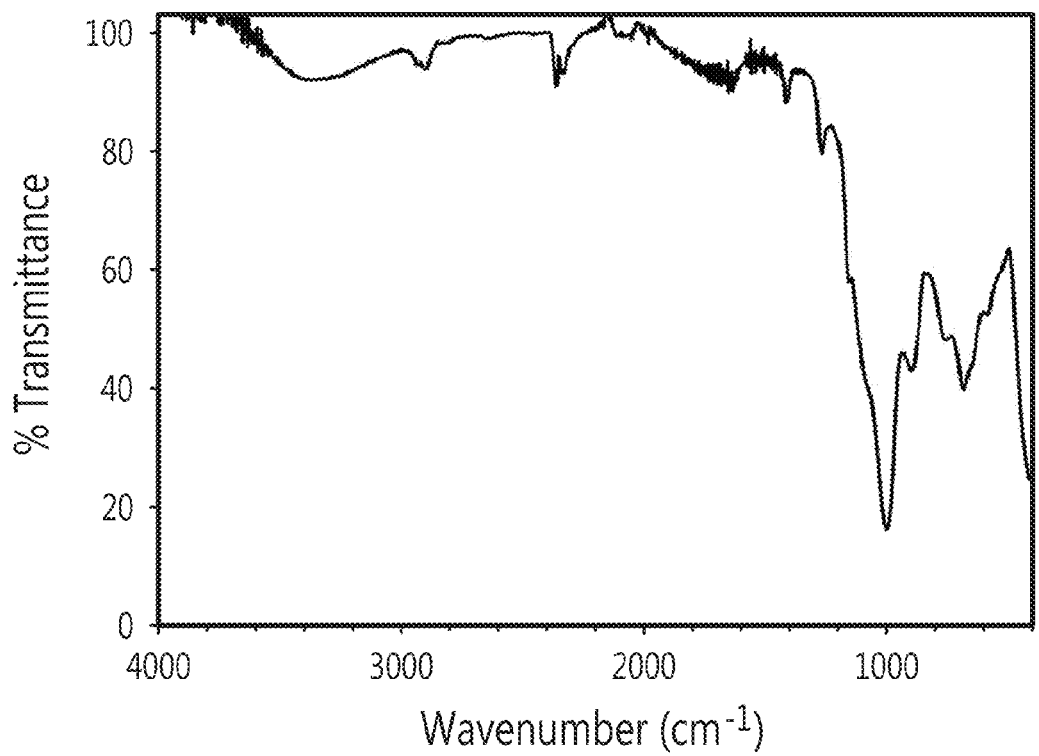
FIG. 24: is an IR spectrum of organosilica from preparation 7.
Figure 25:
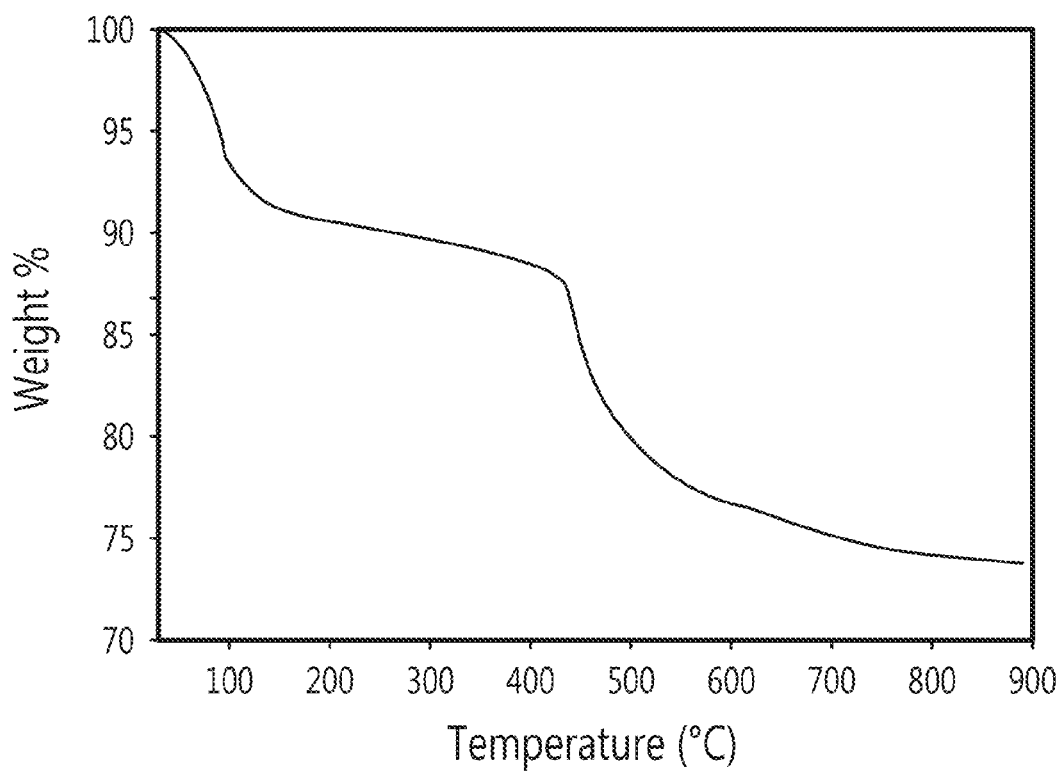
FIG. 25: is a graph of the TGA data of organosilica from preparation 7.

Organosilica-NCC composite films were prepared using 1,2-bis(triethoxysilyl)-ethane as the organosilica precursor (Preparations 6 and 8). Preparation 6 gives free-standing films with a chiral nematic structure as indicated by a reflectance peak at 620 nm (FIG. 22) in the UV-visible spectrum. These films were studied to determine whether acid hydrolysis can be used to generate mesoporous organosilica from organosilica-NCC composites; i.e., whether NCC can be selectively removed from the composite without decomposition of the organosilica. The composite material was subjected to concentrated HCl at 85° C. followed by brief treatment with $H_2SO_4$/hydrogen peroxide (Preparation 7) in order to ensure complete removal of NCC and any cellulosic decomposition products. This treatment results in somewhat flexible, iridescent, free-standing films. After cellulose removal, the reflectance peak in the UV-visible spectrum is shifted to 450 nm (FIG. 23). IR spectroscopy, TGA, and elemental analysis confirm that the cellulose is removed with retention of the ethylene bridge in the organosilica. The IR spectrum (FIG. 24) shows peaks at 1270 $cm^{-1}$ and 690 $cm^{-1}$ corresponding to Si—C symmetric deformation and stretching respectively, while two peaks corresponding to $CH_2$ stretching modes are seen at 2895 $cm^{-1}$ and 2930 $cm^{-1}$. From TGA, a 20% wt. loss is observed at 450° C. (FIG. 25), matching very closely to the theoretical value of 21% based on the loss of $C_2H_4$ from a material with the chemical formula $C_2H_4O_3Si_2$.

Figure 26:
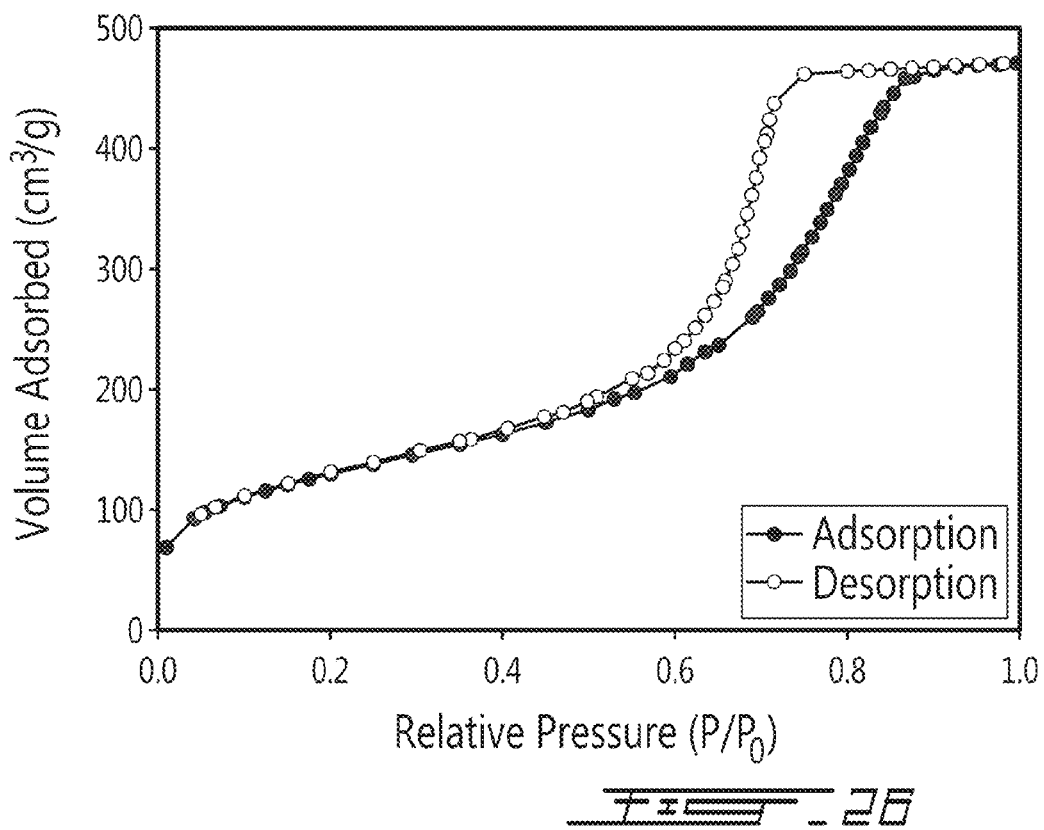
FIG. 26: is a plot of the $N_2$ adsorption-desorption isotherm of organosilica from preparation 7.
Figure 27:
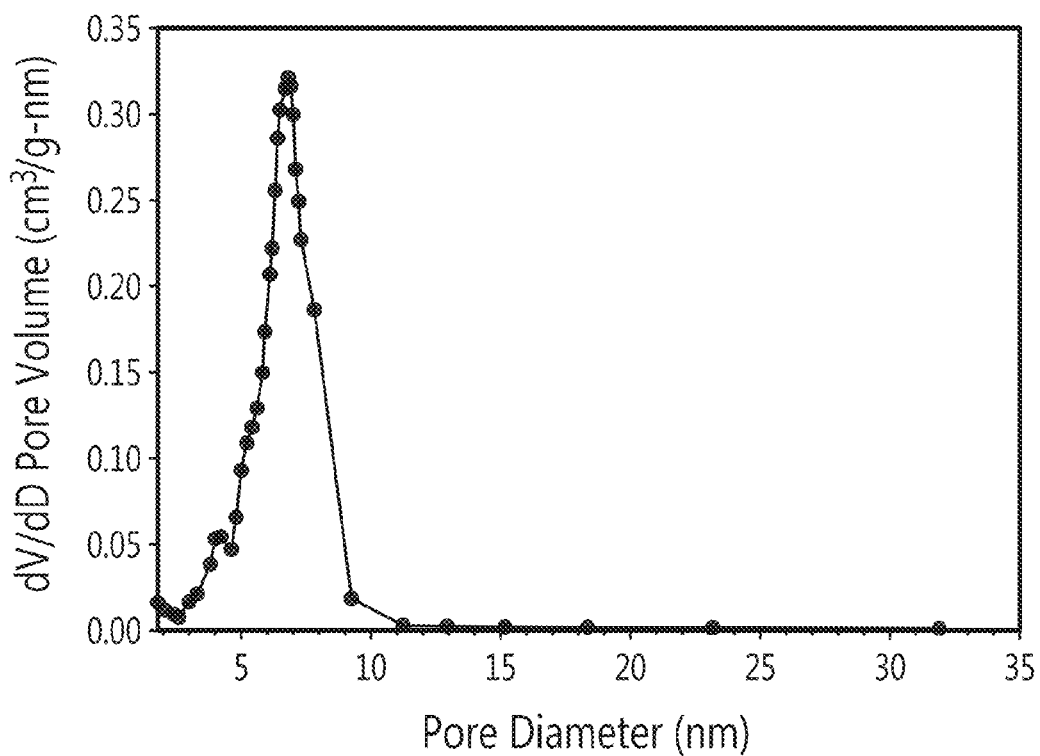
FIG. 27: is a plot of the BJH pore size distribution (desorption) of organosilica from preparation 7.
Figure 28:
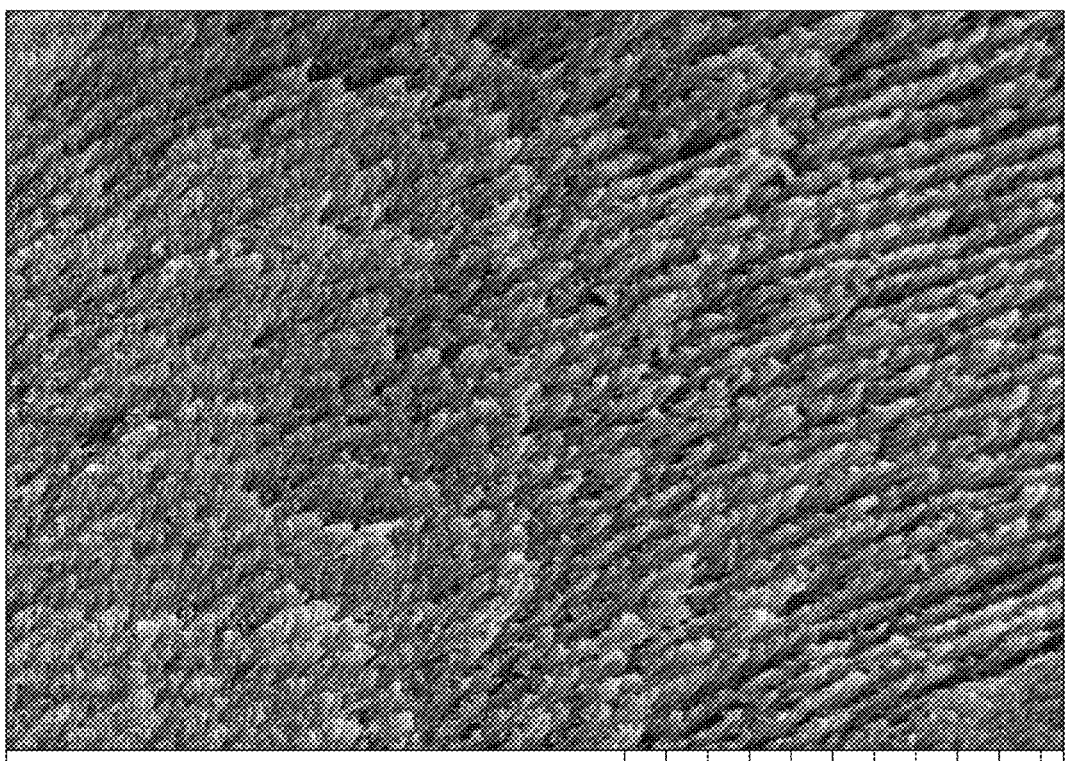
FIG. 28: is an SEM image of organosilica from preparation 7.
Figure 29:
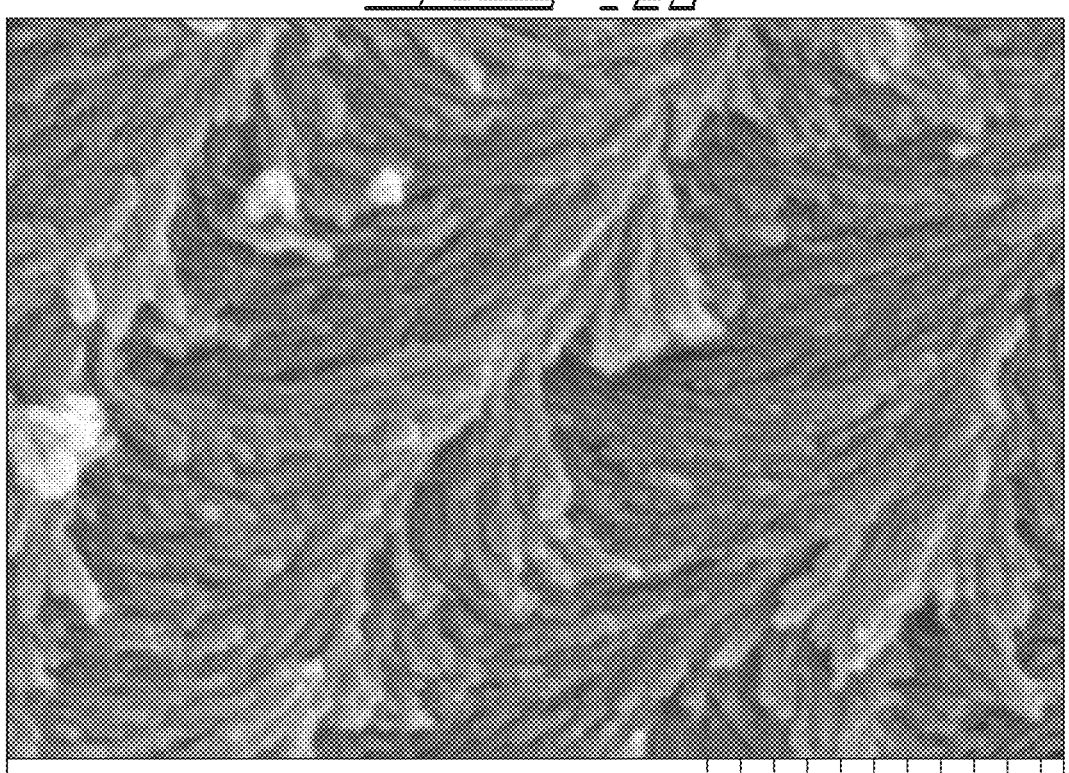
FIG. 29: is an SEM image of organosilica from preparation 7 at higher magnification.

Elemental analysis gives a value of 17.3% carbon, which is again very close to the theoretical value of 18.2% based on the above formula. $N_2$ adsorption shows the organosilica to be mesoporous with a very similar isotherm to that measured for the mesoporous silica prepared using the same procedure (FIG. 26). Indeed the BET surface area (460 $m^2/g$) and peak pore size (7 nm, FIG. 27) are virtually identical to the values calculated for the mesoporous silica prepared using the same conditions (Preparation 3). SEM images show a chiral nematic structure that is an accurate replica of the NCC template (FIGS. 28-29). Generally, the free-standing mesoporous organosilica films appear similar to the corresponding mesoporous silica films, however, the organosilica films are considerably less brittle and more flexible. These superior mechanical properties could be advantageous for certain applications.

Figure 30:
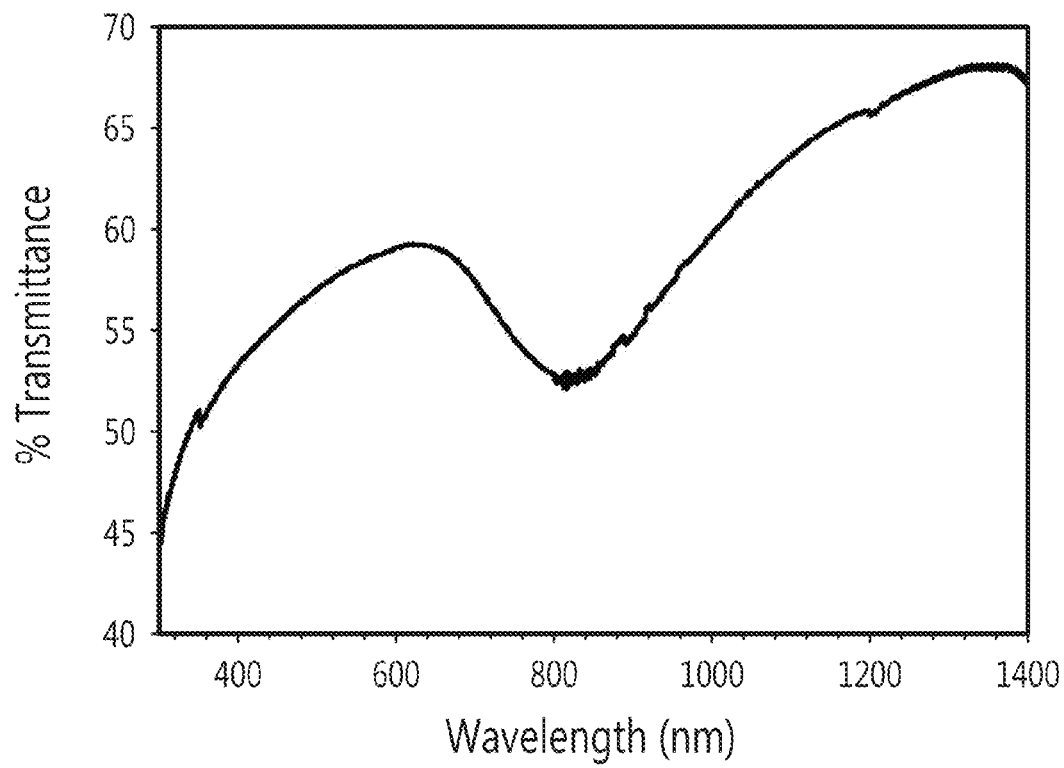
FIG. 30: is a UV-Vis-NIR transmission spectrum of organosilica-NCC composite from preparation 8.
Figure 31:
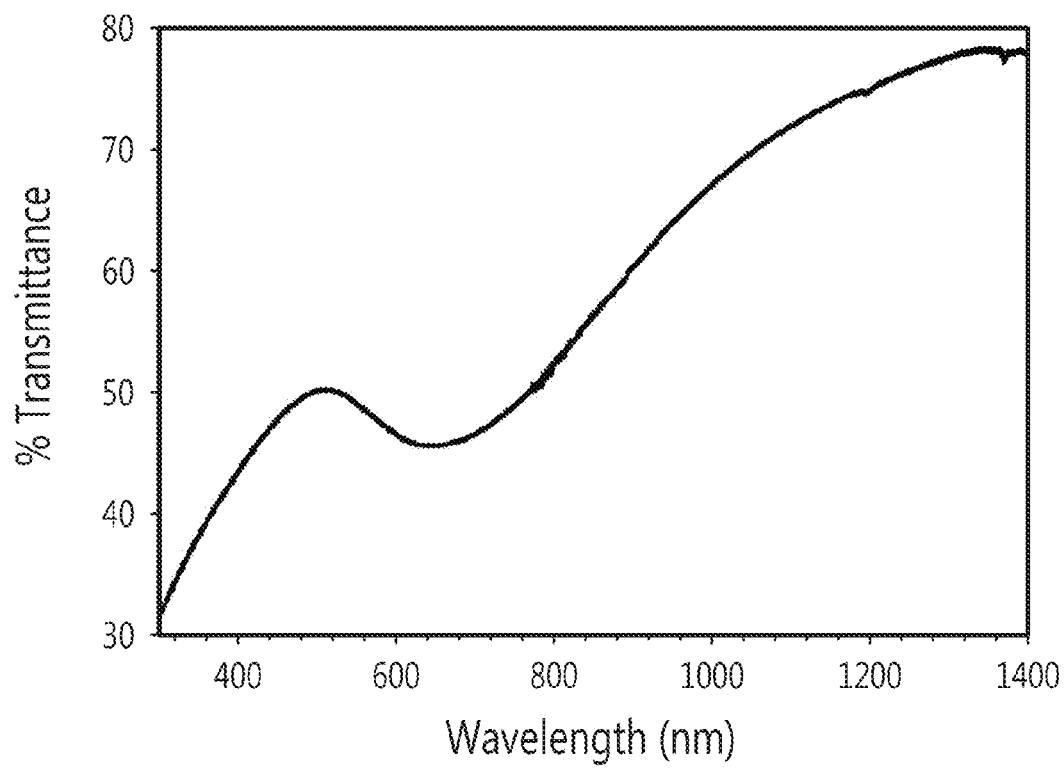
FIG. 31: UV-Vis-NIR transmission spectrum of organosilica from preparation 9.

An additional mesoporous organosilica sample was prepared in order to demonstrate that the color of the films can be tuned in the same way as chiral nematic mesoporous silica films (i.e., by varying the ratio of NCC and silica precursor). Preparation 8 is identical to Preparation 6 except that a higher ratio of 1,2-bis(triethoxysilyl)-ethane was used relative to NCC. As expected, the reflectance peak for this sample is red-shifted ($\lambda_{max}$=820 nm) compared to the sample prepared in Preparation 6 (FIG. 30). Following the same procedure as Preparation 7, the NCC from the composite films may be removed while leaving the organosilica intact, resulting in mesoporous organosilica films with a peak reflectance of 680 nm (Preparation 9, FIG. 31). The color of the mesoporous organosilica films may therefore be tuned by varying the ratio of organosilica precursor to NCC used in the synthesis. Preparations 10 through 19 show further examples of organosilica/NCC composites and the corresponding mesoporous organosilica materials, all with chiral nematic organization as evidenced by iridescence and a reflection peak in the UV-visible/near-IR spectrum. These illustrate that the organic component in the matrix may be varied to obtain the chiral nematic organosilica/NCC composites and mesoporous organosilica materials.

Thus, in accordance with the invention NCC may be selectively removed from silica/NCC or organosilica/NCC composites using acid-catalyzed hydrolysis. The vast literature of pre-treatment methods that are known to improve the efficiency of acid-catalyzed cellulose hydrolysis (e.g. hydrothermal, ozonolysis, etc.) should also be applicable to the process of the invention, given the stabilities of silica and organosilica materials. For both silica and organosilica, the resulting mesoporous materials may be obtained as free-standing chiral nematic films with larger mesopores than the corresponding materials obtained by calcination. This process allows for a completely novel material to be synthesized, namely mesoporous organosilica templated by NCC, which cannot be synthesized by calcination of an organosilica-NCC composite material. The chiral nematic structure of these films results in iridescence, the color of which may be tuned by changing the ratio of organosilica precursor to NCC. Silica-NCC and organosilica-NCC composites can also be prepared that do not have the chiral nematic structure, the acid treatment method described herein may be applied to such materials to afford porous silica or organosilica with or without chiral nematic organization. The combination of porosity and optical properties in these materials makes them interesting for a wide range of applications.

EXAMPLES

In the Examples, sonication was applied to ensure that the NCC particles were dispersed. The sonicator was a standard laboratory model (2 A, 120 V) available from VWR (Aquasonic model 50T—trademark). A sonication time of 10-15 minutes was typically applied prior to addition of the silicon-containing compound.

Preparation 1

4 mL of tetramethoxysilane (TMOS) is added to 100 mL of a freshly sonicated 3.5% aqueous suspension of NCC. The mixture is stirred for 1 h at 20° C. and then poured into polystyrene Petri dishes to evaporate. The resulting colorless films are peeled off of the substrate to obtain free-standing composite films with a reflectance peak at 1260 nm (FIG. 1).

Preparation 2

Silica/NCC composite films from preparation 1 (411 mg) are added to 500 mL of 12 M HCl and heated to 85° C. for 18 h. After cooling to room temperature, the reaction mixture is poured into 1 L of water and filtered. The recovered films are washed with water and after drying, 216 mg of light brown/iridescent films with a reflectance peak at 700 nm (FIG. 2) are obtained. The IR spectrum (FIG. 3) and TGA (FIG. 4) of the sample show that NCC decomposition has occurred with some residual organic material remaining in the films. $N_2$ adsorption measurements (FIG. 5) give a BET surface area of 470 $m^2/g$ and a specific pore volume of 0.68 $cm^3/g$.

Preparation 3

Mesoporous silica films from preparation 2 (150 mg) are placed in 100 mL of 4:1 $H_2SO_4$/hydrogen peroxide (30%) until the films are completely colorless (~5 min). The reaction mixture is poured into 1 L of water and filtered. The recovered films are washed with water and after drying, 120 mg of iridescent films with a reflectance peak at 680 nm (FIG. 7) are obtained. The IR spectrum (FIG. 8), elemental analysis, and TGA (FIG. 9) of the sample show that all organic material has been removed. $N_2$ adsorption measurements (FIG. 10) give a BET surface area of 450 $m^2/g$ and a specific pore volume of 0.77 $cm^3/g$.

Preparation 4

Silica/NCC composite films from preparation 1 (400 mg) are added to 160 mL of 9M $H_2SO_4$ and heated to 85° C. for 18 h. After cooling to room temperature, the reaction mixture is poured into 1 L of water and filtered. The recovered films are washed with water and after drying, 160 mg of mostly colorless iridescent films with a reflectance peak at 680 nm (FIG. 14) are obtained. The IR spectrum (FIG. 17) and TGA (FIG. 18) of the sample show that the NCC has been removed from the films. $N_2$ adsorption measurements (FIG. 15) give a BET surface area of 750 $m^2/g$ and a specific pore volume of 0.92 $cm^3/g$.

Preparation 5

Silica/NCC composite films from preparation 1 (400 mg) are added to 160 mL of concentrated nitric acid and heated to 85° C. for 18 h. After cooling to room temperature, the reaction mixture is poured into 1 L of water and filtered. The recovered films are washed with water and after drying, 130 mg of iridescent films with a reflectance peak at 560 nm (FIG. 19) are obtained. The IR spectrum and TGA of the sample show that the NCC has been removed from the films. $N_2$ adsorption measurements (FIG. 20) give a BET surface area of 450 $m^2/g$ and a specific pore volume of 0.30 $cm^3/g$.

Preparation 6

1.28 mL of 1,2-bis(triethoxysilyl)-ethane is added to 20 mL of a freshly sonicated 3% aqueous suspension of NCC. The mixture is stirred for 3 h at 90° C. and then left stirring at 20° C. for 18 h. The reaction mixture is microfiltered (0.45 μm) and poured into polystyrene Petri dishes to evaporate. The resulting iridescent films are peeled off of the substrate to obtain free-standing composite films with a reflectance peak at 620 nm (FIG. 22).

Preparation 7

Organosilica/NCC composite films from preparation 6 (360 mg) are placed in 400 mL of 12 M HCl and heated to 85° C. for 18 h. After cooling to room temperature, the reaction mixture is poured into 1 L of water and filtered. After washing with water and drying, the slightly brown iridescent films are placed in 50 mL of 4:1 $H_2SO_4/H_2O_2$ (30%) until the films are completely colorless (~2-3 min). The reaction mixture is poured into 500 mL of water, filtered, and washed with water. After air-drying, 160 mg of iridescent films with a reflection peak at 450 nm (FIG. 23) are obtained. IR spectroscopy (FIG. 24), TGA (FIG. 25), and elemental analysis confirm that the cellulose is removed with retention of the ethylene bridge in the organosilica. $N_2$ adsorption measurements (FIG. 26) give a BET surface area of 460 $m^2/g$ and a specific pore volume of 0.73 $cm^3/g$.

Preparation 8

1.70 mL of 1,2-bis(triethoxysilyl)-ethane is added to 20 mL of a freshly sonicated 3% aqueous suspension of NCC. The mixture is stirred for 3 h at 90° C. and then left stirring at 20° C. for 18 h. The reaction mixture is microfiltered (0.45 μm) and poured into polystyrene Petri dishes to evaporate. The resulting iridescent films are peeled off of the substrate to obtain free-standing composite films with a reflectance peak at 820 nm (FIG. 30).

Preparation 9

Organosilica/NCC composite films from preparation 8 (584 mg) are placed in 400 mL of 12 M HCl and heated to 85° C. for 18 h. After cooling to room temperature, the reaction mixture is poured into 1 L of water and filtered. After washing with water and drying, the slightly brown iridescent films are placed in 50 mL of 4:1 $H_2SO_4/H_2O_2$ (30%) until the films are completely colorless (~2-3 min). The reaction mixture is poured into 500 mL of water, filtered, and washed with water. After air-drying, 270 mg of iridescent films with a reflection peak at 680 nm (FIG. 31) are obtained. IR spectroscopy, TGA, and elemental analysis confirm that the cellulose is removed with retention of the ethylene bridge in the organosilica. $N_2$ adsorption measurements give a BET surface area of 498 $m^2/g$ and a specific pore volume of 0.80 $cm^3/g$.

Preparation 10

0.5 mL of 1,2-bis(trimethoxysilyl)-ethane is added to 15 mL of 3.5% aqueous NCC. The mixture is stirred for 2 h at room temperature. The reaction mixture is poured into polystyrene Petri dishes to evaporate. The resulting iridescent films are peeled off of the substrate to obtain free-standing composite films with a reflectance peak at ~1160 nm.

Preparation 11

Organosilica/NCC composite films from preparation 10 are placed in 6M $H_2SO_4$ and heated to 100° C. for 20 hours. After cooling to room temperature, the reaction mixture was filtered and alternately washed with a solution of piranha (20 mL 30% $H_2O_2$/100 mL $H_2SO_4$) and water until colorless. The films were then washed with water and allowed to air-dry. 130 mg of the iridescent films with a reflection peak at ~720 nm are obtained. IR spectroscopy and TGA confirmed that the cellulose is removed with retention of the ethylene bridge in the organosilica. $N_2$ adsorption measurements indicate a mesoporous material with a BET surface area of 594 $m^2/g$ and a specific pore volume of 0.87 $cm^3/g$.

Preparation 12

0.47 mL of 1,2-bis(triethoxysilyl)-methane is added to 10 mL of 3.5% aqueous NCC and 4 mL of ethanol. The mixture is stirred for 2 h at room temperature. The reaction mixture is poured into polystyrene Petri dishes to evaporate. The resulting iridescent films are peeled off of the substrate to obtain free-standing composite films with a reflectance peak at ~1215 nm.

Preparation 13

Organosilica/NCC composite films from preparation 12 are placed in 6M $H_2SO_4$ and heated to 100° C. for 20 hours. After cooling to room temperature, the reaction mixture was filtered and alternately washed with a solution of piranha (20 mL 30% $H_2O_2$/100 mL $H_2SO_4$) and water until colorless. The films were then washed with water and allowed to air-dry. 101 mg of the iridescent films with a reflection peak at ~670 nm are obtained. IR spectroscopy, TGA, and elemental analysis confirmed that the cellulose is removed with retention of the methylene bridge in the organosilica. $N_2$ adsorption measurements show the material is mesoporous with a BET surface area of 518 $m^2/g$ and a specific pore volume of 0.54 $cm^3/g$.

Preparation 14

1.2 mL of 1,4-bis(triethoxysilyl)-benzene is added to 35 mL of freshly sonicated 3.5% aqueous NCC and 35 mL of ethanol. The mixture is stirred for 2 h at room temperature. The reaction mixture is poured into polystyrene Petri dishes to evaporate. The resulting iridescent films are peeled off of the substrate to obtain free-standing composite films with a reflectance peak at ~1470 nm.

Preparation 15

Organosilica/NCC composite films from preparation 14 are placed in concentrated HCl and heated to 90° C. for 20 hours. The films were filtered, washed with water and placed in a solution of hydrogen peroxide (30%, 20 mL) and silver nitrate (0.013 g) at 90° C. for 2 hours. The films were then filtered, placed in water and heated to 70° C. overnight. The films were filtered and allowed to air-dry. 73 mg of the iridescent films with a reflection peak at ~665 nm are obtained. IR spectroscopy and TGA confirmed that the cellulose is removed with retention of the benzene bridge in the organosilica.

Preparation 16

0.24 mL of 1,2-bis(trimethoxysilyl)-ethane and 0.13 mL of 1,6-bis(trimethoxysilyl)-hexane is added to 10.2 mL of 3.5% aqueous NCC. The mixture is stirred for 2 h at room temperature. The reaction mixture is poured into polystyrene Petri dishes to evaporate. The resulting iridescent films are peeled off of the substrate to obtain free-standing composite films with a reflectance peak at ~1215 nm.

Preparation 17

Organosilica/NCC composite films from preparation 16 are placed in 6M $H_2SO_4$ and heated to 100° C. for 20 hours. After cooling to room temperature, the reaction mixture was filtered and alternately washed with a solution of piranha (20 mL 30% $H_2O_2$/100 mL $H_2SO_4$) and water until colorless. The films were then washed with water and allowed to air-dry. 70 mg of the iridescent films with a reflection peak at 700-750 nm are obtained. IR spectroscopy, TGA, and elemental analysis confirmed that the cellulose is removed with retention of the ethylene and hexane bridges in the organosilica. $N_2$ adsorption measurements indicate that the material is mesoporous with a BET surface area of 467 $m^2/g$ and a specific pore volume of 0.78 $cm^3/g$.

Preparation 18

0.47 mL of 1,2-bis(trimethoxysilyl)-ethane and 0.32 mL of 1,4-bis(triethoxysilyl)-benzene is added to 20 mL of freshly sonicated 3.5% aqueous NCC and 20 mL of ethanol. The mixture is stirred for 2 h at room temperature. The reaction mixture is poured into polystyrene Petri dishes to evaporate. The resulting iridescent films are peeled off of the substrate to obtain free-standing composite films with a reflectance peak at ~1445 nm.

Preparation 19

Organosilica/NCC composite films from preparation 18 are placed in concentrated HCl and heated to 80° C. for 20 hours. The films were filtered, washed with water and placed in a solution of hydrogen peroxide (30%, 20 mL) and silver nitrate (0.015 g) at 70° C. for 2 hours. The films were then filtered, placed in water and heated to 70° C. overnight. The films were filtered and allowed to air-dry. 145 mg of the iridescent films with a reflection peak at 1000-1100 nm are obtained. IR spectroscopy, TGA, and elemental analysis confirmed that the cellulose is removed with retention of the ethylene and benzene bridges in the organosilica. $N_2$ adsorption measurements indicate that the product is mesoporous with a BET surface area of 684 $m^2/g$ and a specific pore volume of 1.07 $cm^3/g$.

REFERENCES

1. Davis, M. E. Ordered porous materials for emerging applications. Nature 417, 813-821 (2002).
2. Ying, J. Y., Mehnert, C. P. & Wong, M. S. Synthesis and applications of supramolecular-templated mesoporous materials. Angew. Chem. Int. Ed. 38, 56-77 (1999).
3. Kresge, C. T., Leonowicz, M. E., Roth, W. J., Vartuli, J. C. & Beck, J. S. Ordered mesoporous molecular sieves synthesized by a liquid-crystal template mechanism. Nature 359, 710-712 (1992).
4. Beck, J. S. et al. U.S. Pat. No. 5,108,725 (1992).
5. Beck, J. S. et al. WO Patent 91/11390 (1991).
6. Zhao, D. Y., Feng, J. L., Huo, Q. S., Melosh, N., Fredrickson, G. H., Chmelka, B. F. & Stucky, G. D. Triblock copolymer syntheses of mesoporous silica with periodic 50 to 300 angstrom pores. Science 279, 548-552 (1998).
7. Taney, P. T. & Pinnavaia, T. J. Mesoporous silica molecular sieves prepared by ionic and neutral surfactant templating: A comparison of physical properties. Chem. Mater. 8, 2068-2079 (1996).
8. Zhao, D. Y., Feng, J. L., Huo, Q. S., Chmelka, B. F. & Stucky, G. D. Nonionic triblock and star diblock copolymer and oligomeric surfactant syntheses of highly ordered, hydrothermally stable, mesoporous silica structures. J. Am. Chem. Soc. 120, 6024-6036 (1998).
9. Asefa, T., MacLachlan, M. J., Coombs, N. & Ozin, G. A. Periodic mesoporous organosilicas with organic groups inside the channel walls. Nature 402, 867-871 (1999).
10. Inagaki, S., Guan, S., Ohsuna, T. & Terasaki, O. An ordered mesoporous organosilica hybrid material with a crystal-like wall structure. Nature 416, 304-307 (2002).
11. Asefa, T., Kruk, M., MacLachlan, M. J., Coombs, N., Grondey, H., Jaroniec, M. & Ozin, G. A. Novel bifunctional periodic mesoporous organosilicas, BPMOs: Synthesis, characterization, properties and in-situ selective hydroboration-alcoholysis reactions of functional groups. J. Am. Chem. Soc. 123, 8520-8530 (2001).
12. Lu, Y., Fan, H., Doke, N., Loy, D. A., Assink, R. A., LaVan, D. A. & Brinker C. J. Evaporation-induced self-assembly of hybrid bridged silsesquioxane film and particulate mesophases with integral organic functionality. J. Am. Chem. Soc. 122, 5258-5261 (2000).
13. Burleigh, M. C., Markowitz, M. A., Jayasundera, S., Spector, M. S., Thomas, C. W. & Gaber, B. P. Mechanical and hydrothermal stabilities of aged periodic mesoporous organosilicas. J. Phys. Chem. B 107, 12628-12634 (2003).
14. Dujardin, E., Blaseby, M. & Mann, S. Synthesis of mesoporous silica by sol-gel mineralisation of cellulose nanorod nematic suspensions. J. Mater. Chem. 13, 696-699 (2003).

15. Thomas, A. & Antonietti, M. Silica nanocasting of simple cellulose derivatives: towards chiral pore systems with long-range order and chiral optical coatings. Adv. Funct. Mater. 13, 763-766 (2003).
16. Wang, W., Liu, R., Liu, W., Tan, J., Liu, W., Kang, H. & Huang, Y. Hierarchical mesoporous silica prepared from ethyl-cyanoethyl cellulose cholesteric liquid crystalline phase. J. Mater. Sci. 45, 5567-5573 (2010).
17. Shopsowitz, K. E., Qi, H., Hamad, W. Y. & MacLachlan M. J. Free-standing mesoporous silica films with tunable chiral nematic structures. Nature 468, 422-425 (2010).
18. Mosier, N., Wyman, C., Dale, B., Elander, R., Lee, Y. Y., Holtzapple, M. & Ladisch M. Features of promising technologies for pretreatment of lignocellulosic biomass. Bioresource Technology 96, 673-686 (2005).
19. Saeman, J. F. Kinetics of wood saccharification-hydrolysis of cellulose and decomposition of sugars in dilute acid at high temperature. Industrial and Engineering Chemistry 37, 43-52 (1945).
20. Amarasekara, A. S. & Owereh, O. S. Hydrolysis and decomposition of cellulose in Bronsted acidic ionic liquids under mild conditions. Ind. Eng. Chem. Res. 48, 10152-10255 (2009).

The invention claimed is:

1. A process of producing a mesoporous siliceous material having chiral nematic order comprising:
acid hydrolysis of cellulose in a siliceous composite selected from the group consisting of silica/nanocrystalline cellulose composites and organosilica/nanocrystalline cellulose composites to produce a mesoporous siliceous material having chiral nematic order from which nanocrystalline cellulose has been removed by said acid hydrolysis.

2. A process according to claim 1, wherein said acid hydrolysis is carried out with a concentrated inorganic acid in water at a temperature of 70° C. to 120° C.

3. A process according to claim 2, wherein said concentrated acid is hydrochloric acid, sulphuric acid, nitric acid or trifluoromethanesulfonic acid; and said concentrated acid is greater than 3M.

4. A process according to claim 3, wherein said concentrated acid is hydrochloric acid at a concentration of 10 to 12M; and said temperature is >80° C.

5. A process according to claim 3, wherein said concentrated acid is sulphuric acid at concentration of 4M to 8M.

6. A process according to claim 1, including a step of removing residual cellulose and products of cellulose hydrolysis from said mesoporous siliceous material, after said acid hydrolysis, by oxidising said residual cellulose and products of cellulose hydrolysis.

7. A process according to claim 1, wherein said hydrolysis is carried out with maintenance of pores of a volume corresponding to the volume of the composite occupied by the nanocrystalline cellulose (NCC).

8. A process according to claim 1, wherein said composite comprises a siliceous matrix surrounding a skeleton of NCC crystals said crystals, said skeleton having chiral nematic order and occupying a volume in the composite defining potential mesopores and said chiral nematic order is retained by said mesopores.

9. A process according to claim 1, wherein said siliceous composite is a silica/nanocrystalline cellulose composite having chiral nematic order and said mesoporous siliceous material is mesoporous silica having chiral nematic order.

10. A process according to claim 1, wherein said siliceous composite is an organosilica/nanocrystalline cellulose composite and said mesoporous siliceous material is mesoporous organosilica.

11. A process according to claim 1, wherein said mesoporous siliceous material is a free-standing film.

12. A process according to claim 1, wherein said mesoporous siliceous material has mesopores with a peak pore diameter of at least 5nm.

* * * * *